(12) United States Patent
Huang et al.

(10) Patent No.: US 11,726,325 B2
(45) Date of Patent: Aug. 15, 2023

(54) NEAR-EYE OPTICAL IMAGING SYSTEM, NEAR-EYE DISPLAY DEVICE AND HEAD-MOUNTED DISPLAY DEVICE

(71) Applicant: Jing Jiang, Beijing (CN)

(72) Inventors: Zhengyu Huang, Beijing (CN); Kehan Tian, Beijing (CN)

(73) Assignee: Jing Jiang, Beijing (CN)

( * ) Notice: Subject to any disclaimer, the term of this patent is extended or adjusted under 35 U.S.C. 154(b) by 708 days.

(21) Appl. No.: 16/826,823

(22) Filed: Mar. 23, 2020

(65) Prior Publication Data

US 2020/0225487 A1 Jul. 16, 2020

Related U.S. Application Data

(63) Continuation-in-part of application No. PCT/CN2018/103797, filed on Sep. 3, 2018.

(51) Int. Cl.
*G02B 27/01* (2006.01)
*G02B 3/00* (2006.01)

(52) U.S. Cl.
CPC ....... *G02B 27/0172* (2013.01); *G02B 3/0006* (2013.01)

(58) Field of Classification Search
USPC ........................................................ 351/206
See application file for complete search history.

(56) References Cited

U.S. PATENT DOCUMENTS

2012/0249537 A1 10/2012 Bae et al.

FOREIGN PATENT DOCUMENTS

| CN | 206270594 U | 6/2017 |
| WO | 2016064773 A1 | 4/2016 |

OTHER PUBLICATIONS

International Search Report dated Nov. 1, 2018 for International Application PCT/CN2018/103797.

*Primary Examiner* — Collin X Beatty
*Assistant Examiner* — Grant A Gagnon
(74) *Attorney, Agent, or Firm* — Meunier Carlin & Curfman LLC

(57) ABSTRACT

Disclosed in the present application are a near-eye optical imaging system, a near-eye optical imaging system based near-eye display device, and a near-eye display device based head-mounted display device. The near-eye optical imaging system comprises: a display, a first array of microlenses, which comprises a plurality of first microlenses; a second array of microlenses, which is arranged side by side with the first array of microlenses. The plurality of first microlenses in the first array of microlenses correspond to the plurality of second microlenses in the second array of microlenses respectively to form multiple optical channels. According to the present invention, an object located within a near-eye range is imaged by means of using a display, and two microlens arrays in concatenation.

31 Claims, 19 Drawing Sheets

NEAR-EYE OPTICAL IMAGING SYSTEM, NEAR-EYE DISPLAY DEVICE AND HEAD-MOUNTED DISPLAY DEVICE

CROSS-REFERENCE TO RELATED APPLICATION

This application claims priority to, and the benefit of, China patent application CN201710891597.7, filed on Sep. 27, 2017, which is incorporated by reference herein in its entirety.

TECHNICAL FIELD

The present invention generally relates to near-eye optical imaging and display; particularly, the present invention relates to a near-eye optical imaging system for imaging an object located within a near-eye range by means of arrays of microlenses, a near-eye display device based on the near-eye optical imaging system, and a head-mounted display device based on the near-eye display device.

BACKGROUND

With the development of computer technology and display technology, the technology of Virtual Reality (VR) to experience a virtual world through a computer simulation system and the technology of Augmented Reality (AR) and Mixed Reality (MR) to blend displayed content into a real-environment background have developed rapidly.

Near-eye display devices are an important basis for the development of the aforesaid VR, AR and MR technologies. Among others, immersive near-eye display devices can be used in VR technology, while perspective near-eye display devices can be used in AR and MR technologies. In principle, some of the near-eye display devices for AR and MR can also be used for Virtual Reality display after blocking light that is incident into a user's eyes from outside.

Near-eye display devices are usually configured into a head-mounted display device for projecting images or information directly into human eyes. By synthesizing virtual magnified images, the near-eye display device, on the one hand, solves the problem that human's naked eyes can't adapt to (focus on) an object very close to the eyes; on the other hand, it can overcome the size limit of the display of a head-mounted display device and provide a better perception of being personally on the scene.

Recent years witness the explosive development of Virtual Reality display devices, and there are many kinds of the devices. Companies like Oculus VR, HTC, Sony and Samsung have launched Virtual Reality helmet display devices, respectively. Most of the near-eye display devices for use in these Virtual Reality helmet displays are based on the principle of imaging by a single positive lens, that is to say, by means of placing a display near the object side focal plane of a single positive lens, to enable the display to form an upright and magnified virtual image at the infinity on the image side of the lens through the single positive lens. When a user's eyeballs are on the other side of the lens, the aforesaid upright and magnified virtual image of the display can be observed. The optical exit pupil of the head-mounted display device is determined by the design of the display. In the aforesaid near-eye display device, the optical exit pupil is directly determined by the diameter of the lens, and the diameter of the lens is in turn directly related to the focal length of the lens. When the numerical aperture of the lens is limited and the display determines the optical exit pupil and thus determines the diameter of the lens, this results in that the focal length of the lens cannot be further reduced. Accordingly, the gap between the display and the lens cannot be further reduced. This is the main reason for the large volume of the current Virtual Reality helmet displays. When the distance between the display and the eyes is limited by the numerical aperture of the lens, a larger display will be needed in order to have a larger displayed field of vision. And then the weight and volume of the display will be further increased, thereby affecting the user's experience.

Near-eye display devices for AR and MR have also been greatly developed in recent years. For example, Microsoft, Lumus and other companies have launched the Augmented Reality products based on an Augmented Reality optical engine which adopts, for example, a near-eye display device based on the waveguide principle or a near-eye display device based on the holographic principle. However, costly waveguide restricts the wide application of the near-eye display device based on the waveguide principle; and costly optical grating restricts the wide application of the near-eye display device based on the holographic principle.

Additionally, in recent years, integral imaging, as an optical field display technology, is very hopeful to achieve a head-mounted display device or "glasses" featured by thinness, lightness and wide field of vision. Integral imaging forms a scene by synthesizing a light field. However, in order to synthesize the light field, it is necessary to present 3D information on a 2D display, wherein the 2D display is divided into a plurality of display blocks to display a plurality of 2D images that are used for the same scene and obtained by pre-processing of a computer. As a result, integral imaging sacrifices the spatial resolution severely of the display, and its application in the field of near-eye display is limited.

As can be found, the near-eye display device is difficult to be configured, and has many disadvantages in performance and cost, which limit the development and popularization of VR, AR and MR display devices.

SUMMARY

The purpose of the present invention is to provide a near-eye optical imaging system and a near-eye display device based on the imaging system, which at least partially solves the aforementioned problems existing in the prior art.

In accordance with one aspect of the present invention, provided is a near-eye display device, which comprises: a display having a display surface for displaying images; a first array of microlenses arranged on a side of the display surface of the display, comprising a plurality of first microlenses; and a second array of microlenses arranged on a side of the first array of microlenses opposite to the display, comprising a plurality of second microlenses. The plurality of first microlenses in the first array of microlenses correspond to a second microlens in the second array of microlenses respectively to form multiple optical channels, wherein in each optical channel, the first microlense forms an image of the display surface, on the object side focal plane of the second microlens to project a parallel light beam. Among others, corresponding to one and the same point on the display surface, multiple parallel light beams projected through the multiple optical channels are parallel to each other. For any two points at different positions on the display surface, light from the two points are projected through the optical channels and form parallel light beams on two different directions, and the relative relation of the two different directions corresponds to the relative position relation of the two points on the display surface.

The refractive power of the plurality of first microlenses can have the same positive or negative characteristics, and the refractive power of the plurality of second microlenses can have the same positive or negative characteristics.

In some embodiments, the plurality of first microlenses of the first array of microlenses form images of the display surface on image planes which are co-planar with each other. The plurality of second microlenses of the second array of microlenses have object side focal planes co-planar with each other, and the object side focal planes coincide with the image planes of the first array of microlenses. Preferably, the plurality of first microlenses can have the same refractive power as each other.

In some embodiments, a distance $d_1$ between the two unit lenses in the first microlenses and a distance $d_2$ between the two unit lenses in the second microlenses in any two optical channels satisfy the following relation:

$$d_2 = d_1\left(1 + \frac{v_1}{u_1}\right)$$

wherein $u_1$ is the object distance, which is the distance from the display surface of the display to the first array of microlenses, and $v_1$ is the image distance, which is the distance from the image plane to the first array of microlenses. $v_1$ is positive when the first microlenses present a real image, and $v_1$ is negative when the first microlenses present a virtual image.

In some embodiments, the plurality of first microlenses of the first array of microlenses can be arranged periodically, and the plurality of second microlenses of the second array of microlenses can also be arranged periodically, both of which satisfy the following relation:

$$P_2 = P_1(1+M_1)$$

wherein $P_1$ is an arrangement period of the plurality of first microlenses of the first array of microlenses in a direction, $P_2$ is an arrangement period of the plurality of second microlenses of the second array of microlenses in the direction, and $M_1$ represents a magnification of the first microlenses to the display surface of the display, i.e.

$$M_1 = \frac{v_1}{u_1}.$$

Preferably, the plurality of second microlenses are positive lenses, and the plurality of first microlenses form an upright image of the display surface of the display. The plurality of first microlenses can be negative lenses, and the plurality of first microlenses form a shrinked virtual image of the display surface of the display at a location between the display and the first array of microlenses.

Preferably, the plurality of second microlenses are negative lenses, and the plurality of first microlenses form an inverted image of the display surface of the display. The plurality of first microlenses can be positive lenses, and the plurality of first microlenses form a shrinked real image on the side of the second array of microlenses opposite to the first array of microlenses.

Preferably, the plurality of first microlenses include at least two different types of lenses, and/or the plurality of second microlenses include at least two different types of lenses. The plurality of first microlenses and the plurality of second microlenses can include at least one type of spherical lens, aspheric lens, graded index lens, Fresnel lens and multi-level near-curved lens.

In some embodiments, at least one of the first microlenses and the second microlenses is arranged at intervals.

At least a part of the first microlenses and the second microlenses can be a combined lens comprising more than or equal to two microlenses in cascade. In some embodiments, the first array of microlenses comprises two or more layers of microlens arrays superimposed together, and the two or more microlenses in cascade include microlenses from the two or more layers of microlens arrays, respectively; and/or the second array of microlenses comprises more than or equal to two layers of microlens arrays superimposed together, and the two or more microlenses in cascade include microlenses from the two or more layers of microlens arrays, respectively.

Preferably, the first array of microlenses and the second array of microlenses are formed on the surfaces opposite to each other on two substrates, respectively, and an air gap exists between the first array of microlenses and the second array of microlenses.

In accordance with another aspect of the present invention, provided is a near-eye optical imaging system, which comprises: a first array of microlenses comprising a plurality of first microlenses; and a second array of microlenses arranged side by side with the first array of microlenses, comprising a plurality of second microlenses. The plurality of first microlenses in the first array of microlenses correspond to a second microlens in the second array of microlenses respectively to form multiple optical channels. In each optical channel, the first microlens forms on an object side focal plane of the second microlens an image of an object located on a predetermined object plane, to project parallel light beams. Corresponding to one and the same point on the object plane, multiple parallel light beams projected through the multiple optical channels are parallel to each other; and corresponding to any two points at different positions on the object plane, parallel light beams in different directions are projected through the optical channels, and the relative relation of the different directions corresponds to the relative position relation of the two points on the object plane.

In accordance with another aspect of the present invention, provided are a near-eye optical imaging system and a near-eye display device comprising the near-eye optical imaging system. The near-eye optical imaging system comprises: a first array of microlenses comprising a plurality of first microlenses arranged periodically with the same refractive power; and a second array of microlenses arranged side by side with the first array of microlenses, comprising a plurality of second microlenses arranged periodically with the same refractive power, one of the first array of microlenses and the second array of microlenses being a positive lens array, the other being a negative lens array. The plurality of first microlenses of the first array of microlenses form on image planes coplanar with each other images of an object located on a predetermined object plane, the plurality of second microlenses of the second array of microlenses have object side focal planes coplanar with each other, and the object side focal planes coincide with the image planes of the first array of microlenses. Furthermore, the first array of microlenses and the second array of microlenses are configured to meet the following relation:

$$P_2 = P_1\left(1 + \frac{v_1}{u_1}\right)$$

wherein $P_1$ is an arrangement period of the plurality of first microlenses of the first array of microlenses in a direction, $P_2$ is an arrangement period of the plurality of second microlenses of the second array of microlenses in the direction. $u_1$ is an object distance from the object plane to the first array of microlenses, and $v_1$ is an image distance from the image plane to the first array of microlenses, $u_1$ being positive when the object is a real object relative to the first microlens, $u_1$ being negative when the object is a virtual object relative to the first microlens, $v_1$ being positive when the first microlens presents a real image, and $v_1$ being negative when the first microlens presents a virtual image.

In accordance with one more aspect of the present invention, provided is a head-mounted display device, which comprises: a head-mounted device comprising the aforesaid near-eye display device, the near-eye display device arranged to be located within a near-eye range of both eyes of a wearer of the head-mounted display device.

The head-mounted display device can also comprise a control unit in connection and communication with the head-mounted device and operable to control the near-eye display device to switch between a 2D display mode and a 3D display mode, wherein the display of the near-eye display device, in the 2D display mode, shows the same image to the left and right eyes of the wearer, and the display of the near-eye display device, in the 3D display mode, shows different images to the left and right eyes of the wearer.

A near-eye optical imaging system/near-eye display device according to the present invention is configured based on two arrays of microlenses, and the arrays of microlenses can be made light in weight and thin in shape, such that the near-eye optical imaging system/near-eye display device according to the present invention and a head-mounted display device configured based on the near-eye optical imaging system/near-eye display device can also have such features as lightness and thinness. In addition, the costs of manufacturing an array of microlenses are relatively low, which also helps to control the costs of the near-eye optical imaging system, the near-eye display device and the head-mounted display device.

BRIEF DESCRIPTION OF THE DRAWINGS

Other features, purposes and advantages of the present invention will become more apparent and obvious by reading the detailed description of the non-restrictive embodiments with reference to the following drawings.

DETAILED DESCRIPTION

Figure 1:
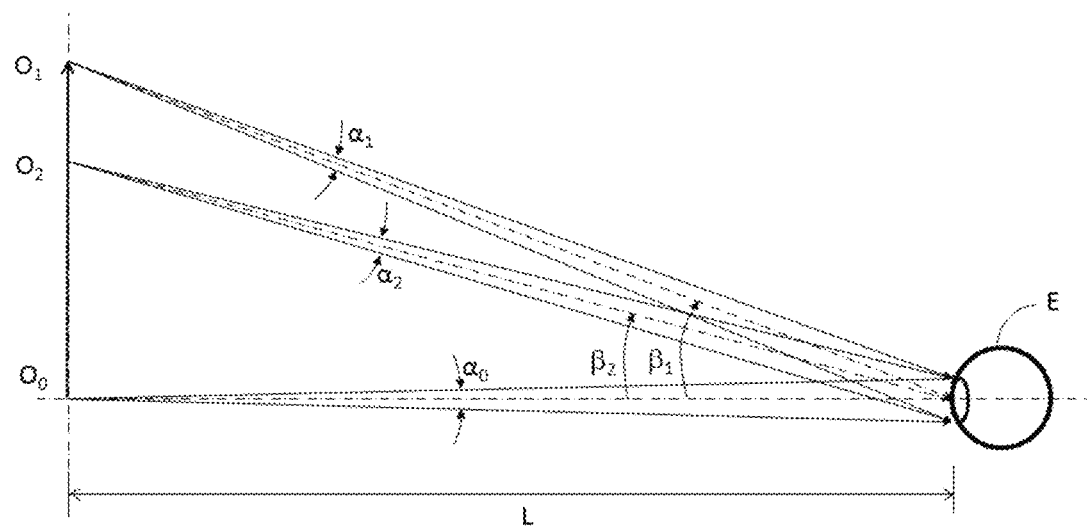
FIG. 1 schematically illustrates the characteristics of light coming from a plane at infinity.

The present invention will be further described in detail with reference to the drawings and embodiments. It can be understood that the specific embodiments described herein are only used to explain some related invention, instead of defining the invention. In addition, it also should be noted that, for the convenience of description, only parts related to the invention are shown in the drawings.

It should be noted that the embodiments in the present application and the features in the embodiments can be combined with each other if there is no conflict there between. The present invention will be described in detail below with reference to the drawings together with the embodiments.

In order to facilitate the understanding of the present invention, firstly, the characteristics of light from a plane at infinity are introduced in conjunction with FIG. 1. In the schematic diagram of FIG. 1, it is assumed that the plane denoted by the dotted line on the left side of the figure is located at infinity with respect to the eye E on the right side of the figure (the eye is only a specific, not limiting, example of an observing subject, and the observing subject can also be, for example, a camera or others), namely, a distance L from the plane to the eye is infinite. By this, because the pupil of the eye is limited in size while the distance L is infinite, an opening angle $\alpha_1$ of a light beam from an object point, e.g. point $O_1$, on the plane and into the pupil of the eye is approximately 0 degree, namely, the beam is formed into a parallel light beam. Then beams from point $O_0$ and point $O_2$ into the eye are also formed into parallel light beams. In other words, for any point at infinity, the observed beams coming from that point is parallel light.

Subsequently, any two points, for example point $O_1$ and point $O_2$, at different positions on the plane at infinity are compared with each other. In the figure, the direction of the longitudinal axis is the direction along a line connecting the two points. Since points $O_1$ and $O_2$ are two points at different positions, they must be separated by a certain distance along the longitudinal axis in the figure, which means that the directions of the two parallel light beams from points $O_1$ and $O_2$ into the eye (represented by elevation angles $\beta_1$ and $\beta_2$ relative to the horizontal direction in the figure) must be different. Moreover, it can be seen that the relative relation between the different directions of the two parallel light beams from points $O_1$ and $O_2$ into the eye (represented by elevation angles $\beta_1$ and $\beta_2$ in the figure) corresponds to the relative position relation between points $O_1$ and $O_2$ on the plane at infinity. More specifically, assuming that point $O_0$ is the origin on the plane at infinity and the direction of the parallel light beam from point $O_0$ into the eye is the reference direction (the elevation angle is zero), in the event that point $O_0$, point $O_1$ and point $O_2$ are collinear, when point $O_1$ is further away from point $O_0$ than point $O_2$, the absolute value of the direction of the parallel light beam corresponding to point $O_1$ (elevation angle $\beta_1$) is greater than that of the direction of the parallel light beam corresponding to point $O_2$ (elevation angle $\beta_1$); furthermore, even not shown in the figure, when point $O_1$ and point $O_2$ are located at the positive and negative sides of point $O_0$ respectively, the directions of their corresponding parallel light beams have different plus or minus characteristics with respect to the reference direction respectively.

In a near-eye optical imaging system according to the present invention, an object plane located within a near-eye range can be imaged onto the plane at infinity by means of combined use of two arrays of microlenses. A near-eye display device according to the present invention can be obtained by a combination of the near-eye optical imaging system of the present invention with a display. The more detailed description will be made below with reference to FIGS. 2 to 4.

Figure 2:
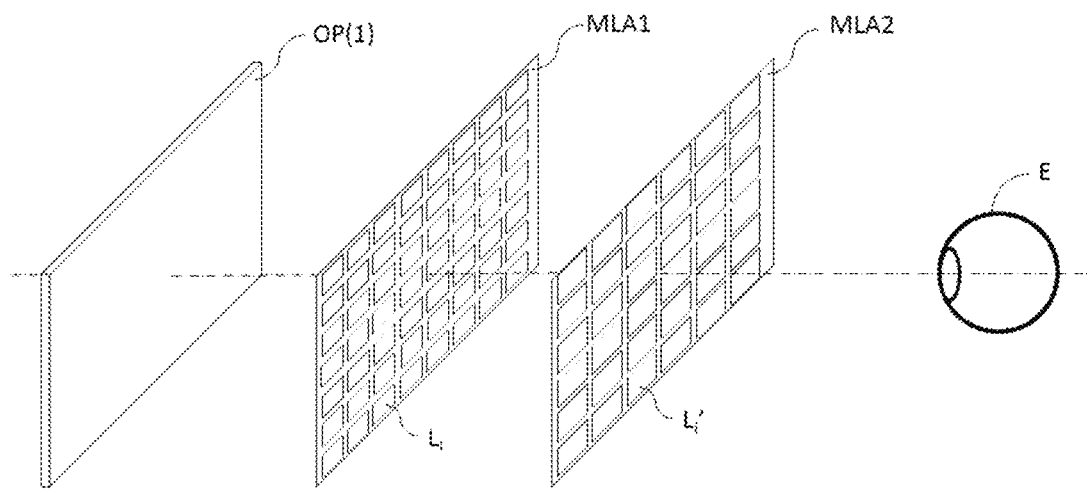
FIG. 2 is an axial side view schematically showing a near-eye optical imaging system according to the present invention.
Figure 3:
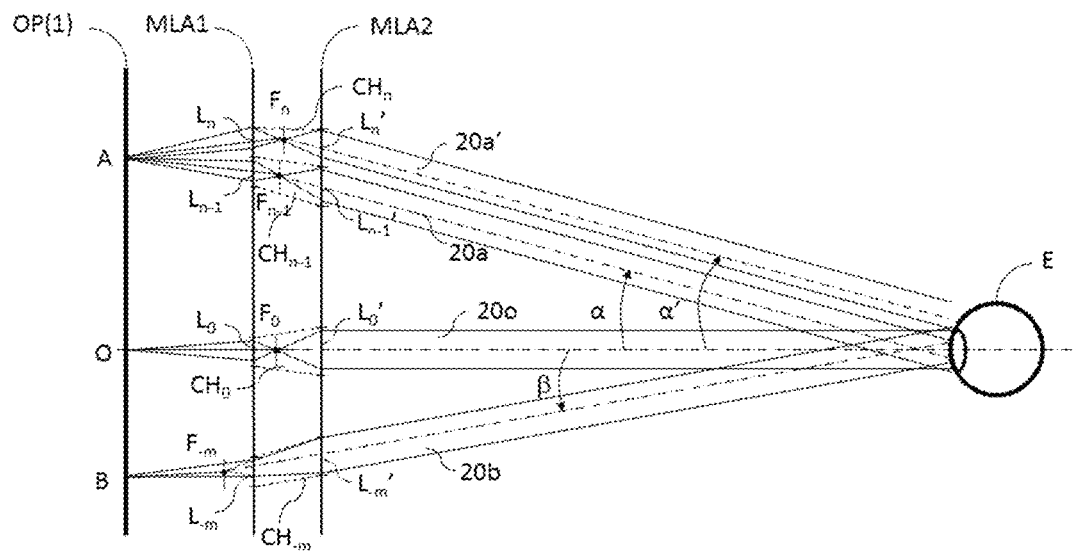
FIG. 3 is a schematic diagram of an imaging optical path of the near-eye optical imaging system according to the present invention.

FIG. 2 schematically shows an axial side view of a near-eye optical imaging system according to the present invention. FIG. 3 is a schematic diagram of an imaging optical path of the near-eye optical imaging system according to the present invention. As shown in the figures, the near-eye optical imaging system comprises a first array of microlenses MLA1 and a second array of microlenses MLA2. The first array of microlenses MLA1 comprises a plurality of first microlenses $L_i$ (only the first microlenses $L_{-m}$, $L_0$, $L_{n-1}$ and $L_n$ are shown in FIG. 3), and the second array of microlenses MLA2 comprises a plurality of second microlenses $L_i'$ (only the second microlenses $L_{-m}'$, $L_0'$, $L_{n-1}'$ and $L_n'$ are shown in FIG. 3). The subscripts like i, m and n are integers, which are used here to represent one of the multiple microlenses. Furthermore, different subscripts represent different microlenses, and when the subscripts are adjacent integers, this means that the corresponding microlenses are also adjacent to each other; and the positive or negative polarity of the subscripts only has the relative significance, and a minus subscript indicates that the corresponding microlens is located on an opposite side of one microlens corresponding to a plus subscript relative to a reference position. It should be noted that FIG. 3 is merely a schematic diagram for the size and position of the first and second microlenses, and the position of the focal plane of the second microlenses, etc.

The reference sign OP denotes an object plane of the first array of microlenses MLA1. For example, an object or picture to be displayed, e.g. a display, can be placed on the object plane OP so as to be imaged by the near-eye optical imaging system according to the present invention. For the purpose of convenient and clear description, a display 1 located on the object plane OP is illustrated as an example.

As shown in FIG. 2, the first array of microlenses MLA1 is arranged on the side of the display surface of the display 1, and the second array of microlenses MLA2 is arranged on a side of the first array of microlenses MLA1 opposite to the display 1.

In use, the object plane OP/the display 1 is located within a near-eye range relative to the eye E. Here, the near-eye range refers to a certain distance range relative to the eye. Because the distance range is too close to the eye, the eye cannot focus on objects within the distance range without assistance. The near-eye range may include/cover, for example, a distance range of spectacle lenses relative to human eyes when the spectacles are worn. The present invention is not limited to any specific value range of a near-eye range.

As shown in FIG. 3, according to the present invention, the plurality of first microlenses $L_i$ in the first array of microlenses MLA1 correspond to a second microlens $L_i'$ in the second array of microlenses MLA2 respectively (i.e. one-to-one correspondence), thereby forming multiple optical channels $CH_i$. For example, as shown in the figure, the first microlenses $L_{-m}$, $L_0$, $L_{n-1}$ and $L_n$ correspond to the second microlenses $L_{-m}'$, $L_0'$, $L_{n-1}'$ and $L_n'$, respectively to form optical channels $CH_{-m}$, $CH_0$, $CH_{n-1}$ and $CH_n$. It should be noted that the first array of microlenses MLA1 and/or the second array of microlenses MLA2 can include redundant unit microlenses, such as redundant unit microlenses located at the edge of the microlens array and not used for imaging.

Although the two adjacent first microlenses $L_{n-1}$ and $L_n$, as shown in the figure, adjoin each other (without any gap), a gap can exist between adjacent first microlenses. Similarly, although the two adjacent second microlenses $L_{n-1}'$ and $L_n'$, as shown in FIG. 3, adjoin each other (without any gap), there also can be a gap between adjacent second microlenses. Accordingly, adjacent optical channels can either adjoin each other, or have a gap therebetween.

According to the present invention, the multiple optical channels can be either tangible channels with solid boundaries or intangible channels without solid boundaries but defined by an actual transmission path of light.

In the case where the optical channels are tangible, for example, a spacer can be arranged between the first array of microlenses MLA1 and the second array of microlenses MLA2, and the spacer can include through-holes respectively corresponding to the optical channels. On the one hand, such spacer can define and separate the optical channels; on the other hand, it can also be used to maintain the spacing between the two arrays of microlenses. Such spacer can be made by means of 3D printing technology, for example.

In the case of no tangible separation formed between the optical channels, light travels from the object plane OP (e.g. the display 1) and finally reaches a target projection position (e.g. a position where the eye pupil is expected to be, relative to the display 1 and the first array of microlenses MLA1 and the second array of microlenses MLA2 in use), and the first microlenses $L_i$ and the second microlenses $L_i'$ corresponding to each other one by one in the first array of microlenses MLA1 and the second array of microlenses MLA2 transmitted and passed through by the light can define an optical channel.

It should be understood that in the absence of the tangible separation between the optical channels, a light beam emergent from a first microlens may enter into more than one second microlens. However, according to the present invention, the one-to-one correspondence between the first microlenses $L_i$ and the second microlenses $L_i'$ is defined with regard to a given target projection position, in which light from the object plane OP either cannot pass through the paired first and second microlenses other than the ones with the defined one-to-one correspondence mentioned above, or cannot reach the given target projection position even if it can pass through the paired first and second microlenses other than the ones with the defined one-to-one correspondence.

By referring back to FIG. 3, three points (point O, point A and point B) on the display 1 and their imaging through the optical channels $CH_{-m}$, $CH_0$, $CH_{n-1}$ and $CH_n$ are schematically shown therein. According to the present invention, each first microlens in the first array of microlenses MLA1 is not limited to imaging some specific point or region, but can image the entire display 1. Taking point O, point A and point B as an example, the imaging of the first array of microlenses MLA1 and the second array of microlenses MLA2 is discussed below.

According to the present invention, for each optical channel, a first microlens forms an image of the display 1 on the object side focal plane of a second microlens, and thus for each point on the display 1, a beam of parallel light is obtained through each optical channel. For example, point O is imaged, through the first microlens $L_0$ in the first array of microlenses MLA1, onto the object side focal plane $F_0$ of the second microlens $L_0'$ corresponding to the first microlens $L_0$, thereby emitting a parallel light beam 20$o$ from the second microlens $L_0'$. Similarly, point B is imaged, through the first microlens $L_{-m}$ in the first array of microlenses MLA1, onto the object side focal plane $F_{-m}$ of the second microlens $L_{-m}'$ corresponding to the first microlens $L_{-m}$, thereby emitting a parallel light beam 20$b$ from the second microlens $L_{-m}'$. Surely, point O and point B can also form parallel light beams through other optical channels.

In some preferred embodiments, the plurality of first microlenses of the first array of microlenses can have the same refractive power to form images of the display surface of the display onto image planes coplanar with each other. The plurality of second microlenses of the second array of microlenses can have the same refractive power, and have coplanar object side focal planes that coincide with the image planes of the first array of microlenses.

However, it should be understood that the multiple first/second microlenses in the first/second array of microlenses are not limited to having coplanar image planes/focal planes, but as long as a first microlens can form an image of the object plane onto the object side focal plane of a second microlens forming therewith one and the same optical channel, the emitted parallel light beam can be obtained.

Further, according to the present invention, corresponding to any point on the object plane OP, multiple parallel light beams projected through different optical channels are parallel to each other. This ensures that the same point on the object is imaged at the same image point at infinity through more than one optical channel. For example, point A is imaged by the first microlenses $L_{n-1}$ and $L_n$ onto the object side focal planes $F_{n-1}$ and $F_n$ of the corresponding second microlenses $L_{n-1}'$ and $L_n'$ respectively, such that parallel light beams 20$a$ and 20$a'$ are emitted from the second microlenses $L_{n-1}'$ and $L_n'$ respectively, and the two parallel light beams 20$a$ and 20$a'$ are also parallel to each other. As shown in FIG. 3, the elevation angle $\alpha$ of the light beam 20$a$ relative to the reference direction (e.g. the direction of the parallel light beam 20$o$ projected by the point O through the optical channel $CH_0$ as shown in FIG. 3) is the same as the corresponding elevation angle $\alpha'$ of the beam 20$a'$.

This can be achieved by means of configuring the first array of microlenses and the second array of microlenses in such a manner that lines connecting images of any point on the display 1 formed by the first microlenses in different optical channels to optical centers of the second microlenses are parallel to each other.

Figure 4:
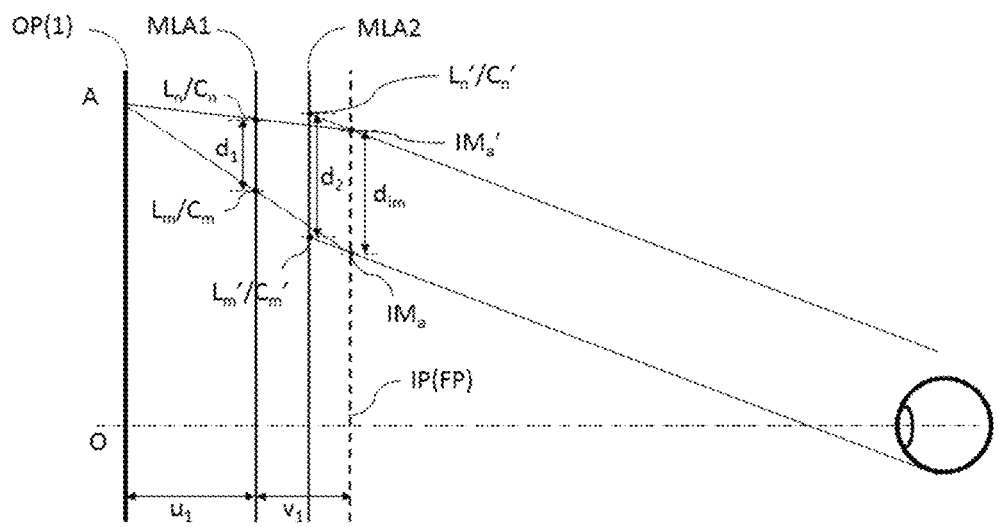
FIG. 4 illustrates a way of implementation of obtaining for the same point parallel light beams parallel to each other through different optical channels.

In an embodiment in which the plurality of first microlenses of the first array of microlenses have coplanar image planes with regard to the object plane OP (the display 1) and the plurality of second microlenses of the second array of microlenses have coplanar object side focal planes, the first array of microlenses and the second array of microlenses can be configured in such a manner that a distance between two second microlenses in any two optical channels is equal to a distance between two images of the display surface respectively formed by two first microlenses in the two optical channels. FIG. 4 illustrates that parallel light beams parallel to each other are obtained through different optical channels for the same point in such embodiment.

In the example shown in FIG. 4, point A is any point located on the display 1, $C_n$ and $C_m$ are optical centers of any two first microlenses $L_n$ and $L_m$ in the first array of microlenses MLA1, and $C_n'$ and $C_m'$ are optical centers of two second microlenses $L_n'$ and $L_m'$ in the second array of microlenses MLA2 corresponding to the first microlenses $L_n$ and $L_m$, respectively. The first array of microlenses MLA1 has an image plane IP with regard to the object plane OP, and the image plane IP coincides with an object side focal plane FP of the second array of microlenses MLA2. It should be noted that the positions of the image plane IP and the object side focal plane FP as shown in the figure are only illustrative, rather than restrictive.

As shown in the figure, point A is imaged by two first microlenses $L_m$ and $L_n$ respectively to obtain two image points $IM_a$ and $IM_a'$, and image points $IM_a$ and $IM_a'$ are located on the image plane IP. It can be seen that the object distances are equal, both being $u_1$, and the image distances are equal, both being $v_1$, in the process of imaging point A through the two first microlenses $L_m$ and $L_n$, respectively. Accordingly, based on the relation of similar triangles, a distance $d_{im}$ between the image points $IM_a$ and $IM_a'$ and a distance $d_1$ between the two first microlenses $L_m$ and $L_n$ (i.e. the distance between the optical centers $C_m$ and $C_n$ of the two first microlenses) satisfy the following relation:

$$d_{im} = d_1\left(1 + \frac{v_1}{u_1}\right) \quad (1)$$

where $u_1$ is an object distance from the display surface of the display to the first array of microlenses, and $v_1$ is an image distance from the image plane to the first array of microlenses; furthermore, $u_1$ is positive when the object is a real object relative to the first microlens, $u_1$ is negative when the object is a virtual object relative to the first microlens, $v_1$ is positive when the first microlens forms a real image, and $v_1$ is negative when the first microlens forms a virtual image.

In the illustrated example, in order to enable light from point A to pass through an optical channel formed by the first microlens $L_n$ and the second microlens $L_n'$ and through an optical channel formed by the first microlens $L_m$ and the second microlens $L_m'$ to form two parallel light beams parallel to each other, a distance $d_2$ between the second microlenses $L_m'$ and $L_n'$ (i.e. the distance between the optical centers $C_m'$ and $C_n'$ of the two second microlenses) should be maintained equal to a distance $d_{im}$ between the image points $IM_a$ and $IM_a'$, namely:

$$d_{im} = d_2 \quad (2)$$

Therefore, a distance $d_1$ between the first microlenses $L_m$ and $L_n$ in any two different optical channels and a distance $d_2$ between the second microlenses $L_m'$ and $L_n'$ satisfy the following relation:

$$d_2 = d_1\left(1 + \frac{v_1}{u_1}\right) \quad (3)$$

The aforesaid description is only based on the example of imaging of the display surface of the display by the near-eye optical imaging system according to the present invention (the object distance $u_1$ is positive), but the present invention is neither limited to the case where images to be displayed are provided by the display, nor to the case where the object plane is located on the incident side of the first array of microlenses. For example, an image to be displayed can be projected by a projector to the emergent side of the first array of microlenses (i.e. forming a virtual object, and in this case, the object distance $u_1$ is negative).

It should be noted that the relation of the distance between the first microlenses to the distance between the second microlenses as discussed above with reference to FIG. 4 is based on the embodiment in which the plurality of first microlenses of the first array of microlenses have coplanar image planes with regard to the object plane OP (the display 1) and the plurality of second microlenses of the second array of microlenses have coplanar object side focal planes. However, the present invention is not limited to such specific way of implementation, and therefore is not limited to satisfying the aforesaid relations.

Further, according to the present invention, corresponding to any two points at different positions on the object plane OP, parallel light beams in different directions are projected through the optical channels, and the relative relation of the different directions corresponds to the relative position relation of the two points on the object. This correspondence is the same as or similar to the correspondence explained above with reference to FIG. 1, i.e. the correspondence between the relative relation of the different directions of two parallel light beams into the eye from any two points at different positions on the plane at infinity and the relative position relation of the two points.

In particular, assumed that a direction of the parallel light into the eye E from point O is the reference direction (the elevation angle is zero), in the event of collinear point O, point A and point B, when point A is further away from point O than point B, the absolute value of the direction of the parallel light corresponding to point A (elevation angle α/α') is greater than that of the direction of the parallel light corresponding to point B (elevation angle β); furthermore, even not shown in the figure, when point A and point B are located at the positive and negative sides of point O respectively, the directions of their corresponding parallel light beams have different polarities with respect to the reference direction.

This can be achieved by, for example, allowing the plurality of first microlenses of the first array of microlenses MLA1 to form an upright image of the display 1 in an embodiment in which the second array of microlenses MLA2 is a positive lens array (the second microlenses are positive lenses), or allowing the plurality of first microlenses of the first array of microlenses MLA1 to form an inverted image of the display 1 in an embodiment in which the second array of microlenses MLA2 is a negative lens array (the second microlenses are negative lenses).

Because the directions of the parallel light beams incident into the eye are corresponding one by one to the image points (positions on the plane) on the plane at infinity, when the relative relation of the different directions of the parallel light beams projected from the optical channels and corresponding to the points at different positions on the display 1 maintains the correspondence with the relative position relation of the points at different positions on the display 1, image points obtained by the parallel light beams on the plane at infinity then have the same relative position relation with the points on the display 1. This means that different points can be imaged in a correct position relation by means of the near-eye optical imaging system according to the present invention.

It should be noted that here, the correspondence between the relative relation of the different directions of the parallel light beams corresponding to points at different positions on the object plane OP and the relative position relation of those different points is not required to be linear. In addition, it can be understood that the near-eye optical imaging system according to the present invention can have different magnifications in different directions without undermining the aforesaid correspondence.

The near-eye optical imaging system/display device according to the present invention and some specific ways of implementation thereof are described above with reference to FIGS. 2, 3 and 4. It should be understood that the near-eye optical imaging system according to the present invention is not limited to, for example, the specific structure of the first array of microlenses and the second array of microlenses.

For example, all unit microlenses in the same array of microlenses are not limited to having the same refractive power, or even not limited to having the same positive or negative polarity of refractive power (i.e. the same array of microlenses may include both positive and negative lenses). For example, in some cases, unit microlenses in the central region of an array of microlenses may have the positive/negative refractive power, while unit microlenses in the peripheral region have the refractive power of the opposite polarity.

For another example, although FIG. 2 shows that unit microlenses (i.e. the first microlenses and the second microlenses) in the first array of microlenses MLA1 and the second array of microlenses MLA2 are arranged periodically into a rectangular array, the present invention is not limited to utilizing an array of microlenses arranged periodically, and is not limited to a specific form of periodic arrangement. In some ways of implementation, the unit microlenses in the first and second arrays of microlenses may be arranged in the shape of honeycomb. Or, in other ways of implementation, the unit microlenses in the first and second arrays of microlenses may be arranged to be corresponding to each other but not in a periodic manner, for example, arranged in a concentric circle.

The type of unit microlenses (i.e. the first microlenses and the second microlenses) in the first array of microlenses MLA1 and the second array of microlenses MLA2 can include, but not limited to, Fresnel lens, spherical/aspheric lens, graded index lens, or Metalens made of, for example, Titanium Dioxide Nanofibers ("Metalenses at visible wavelengths: Diffraction-limited focusing and subwavelength resolution imaging", Science, Vol. 352, Issue 6290, pp. 1190-1194, June 2016, Mohammadreza Khorasaninejadl, Wei Ting Chen, Federico Capasso, et al).

Figure 5:
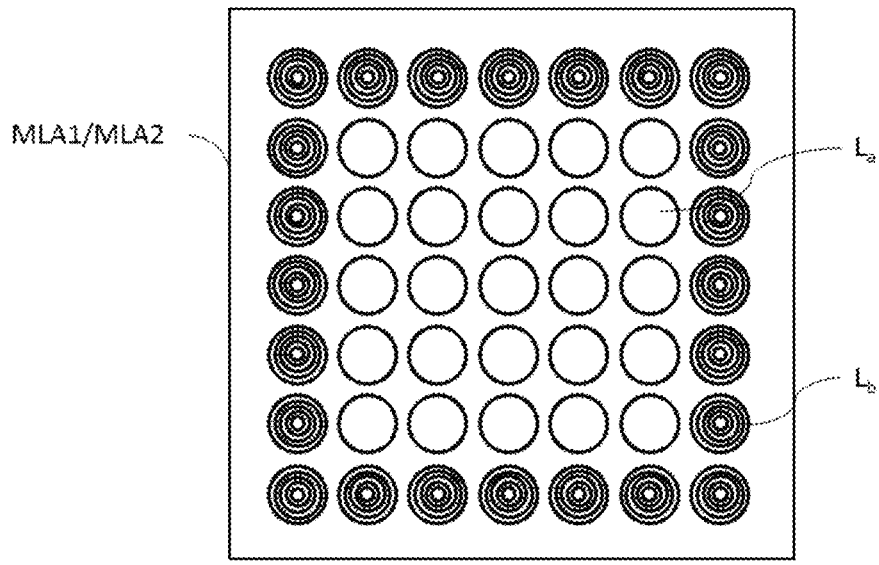
FIG. 5 shows an example of an array of microlenses comprising different types of unit microlenses.

In the near-eye optical imaging system, when it is needed to optimize imaging of a beam incident on the imaging optical component at a large angle, different types of lenses can be used to form different unit microlenses. In other words, the first array of microlenses can include at least two different types of lenses, and/or the second array of microlenses can include at least two different types of lenses. For example, the plurality of first microlenses and the plurality of second microlenses can include at least one of spherical lens, aspheric lens, graded index lens, Fresnel lens and multi-level near-curved lens. FIG. 5 shows an example of such an array of microlenses, in which those unit microlenses arranged in the middle can be, for example, convex lenses while the ones arranged in the periphery can be, for example, Fresnel lenses.

In addition, microlenses for use in the arrays of microlenses of the near-eye optical imaging system and the display device according to the present invention may be a single lens, or a combined lens consisting of two or more microlenses in cascade.

Figure 6A:
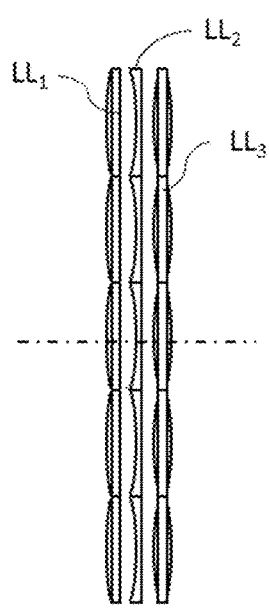
FIG. 6A shows an example of an array of microlenses that can be used as a first array of microlenses and/or a second array of microlenses.

FIG. 6A shows an example of an array of microlenses that can be used as the first array of microlenses and/or the second array of microlenses. In the given example, three layers of microlens arrays $LL_1$, $LL_2$ and $LL_3$ overlap with each other, such that the corresponding unit microlenses in the three layers of microlens arrays can be combined and equivalent to a unit microlens. Thus, the three layers of microlens arrays as a whole are equivalent to an array of microlenses, which can be used as the array of microlenses in the near-eye optical imaging system and the display device according to the present invention, for example as the first array of microlenses and/or the second array of microlenses.

Figure 6B:
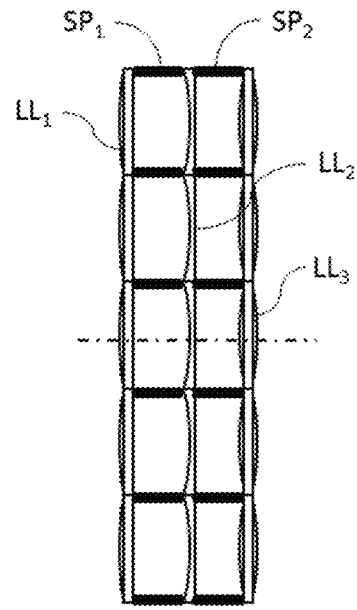
FIG. 6B shows another example of an array of microlenses that can be used as a first array of microlenses and/or a second array of microlenses.

FIG. 6B shows another example of an array of microlenses that can be used as the first array of microlenses and/or the second array of microlenses. As shown in the figure, spacers $SP_1$ and $SP_2$ separate the three layers of microlens arrays $LL_1$, $LL_2$ and $LL_3$ from each other, and also form separation between the adjacent unit microlenses in the same layer of microlens array, such that the corresponding unit microlenses in the three layers of microlens arrays are connected in cascade from front to back, which can be equivalent to a single unit microlens. The three layers of microlens arrays shown in FIG. 6B as a whole are equivalent to an array of microlenses, and also can be used as arrays of microlenses in the near-eye optical imaging system and the display device according to the present invention.

A near-eye display device according to the present invention comprises a display and the near-eye optical imaging system according to the present invention. The following is only about the near-eye optical imaging system; however, it should be understood that the following discussion is also applicable to a near-eye display device according to the present invention.

The First Embodiment

Figure 7:
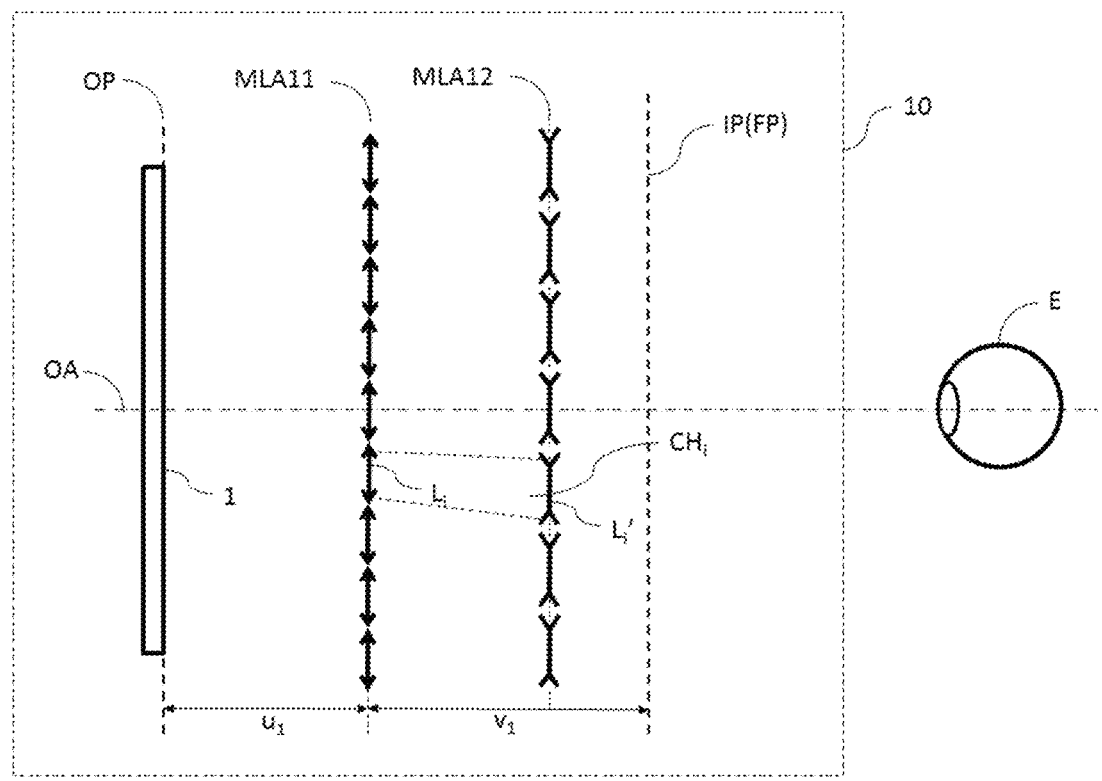
FIG. 7 is a schematic diagram of a near-eye optical imaging system and a near-eye display device according to the first embodiment of the present invention.

A near-eye optical imaging system and near-eye display device 10 according to the first embodiment of the present invention will be described below in conjunction with FIGS. 7 to 12. As shown in FIG. 7, the near-eye display device 10 comprises a display 1, a first array of microlenses MLA11 arranged on the side of the display surface of the display 1, and a second array of microlenses MLA12 arranged on a side of the first array of microlenses MLA11 opposite to the display 1. Except the display 1, other parts of the near-eye display device 10 can constitute a near-eye optical imaging system according to the first embodiment of the present invention.

The first array of microlenses MLA11 includes a plurality of first microlenses $L_i$, and the second array of microlenses MLA12 includes a plurality of second microlenses $L_i'$, wherein the plurality of first microlenses $L_i$ are positive lenses with the same positive refractive power, and the plurality of second microlenses $L_i'$ are negative lenses with the same negative refractive power.

An optical axis OA of the near-eye display device 10 is parallel to the optical axis of each unit microlens (i.e. individual first and second microlens) in the first array of microlenses MLA11 and the second array of microlenses MLA12, and extends through a target projection position. The plurality of first microlenses $L_i$ in the first array of microlenses MLA11 correspond to a second microlens $L_i'$ in the second array of microlenses MLA12 respectively to form multiple optical channels $CH_i$ to project parallel light to the target projection position in correspondence to any point on the display surface of the display 1.

As shown in FIG. 7, the display surface of the display 1 is located on the object plane OP of the first array of microlenses MLA11. The respective image planes of the plurality of first microlenses of the first array of microlenses MLA11 which conjugate with the object plane OP are coplanar with each other. The image planes that are coplanar with each other are marked with the reference sign "IP". The plurality of first microlenses image the display surface of the display 1 onto the image plane IP. The plurality of second microlenses of the second array of microlenses MLA12 have object side focal planes FP coplanar with each other. Since the second microlenses are negative lenses, the object side focal planes FP are located on a side of the second array of microlenses MLA12 opposite to the first array of microlenses MLA11, as shown in the figure. Furthermore, as shown in FIG. 7, the object side focal planes FP coincide with the aforesaid image planes IP. In this way, corresponding to any one point on the display surface of the display 1, a parallel light beam is projected from each second microlens.

According to a preferred embodiment, the object plane OP of the first array of microlenses MLA11 is not located at the focal plane of the first array of microlenses MLA11. The distance u1 between the object plane OP and the optical center of the first array of microlenses MLA11 in the direction of the optical axis of the first array of microlenses is larger than the focal length $f_1$ of the first microlens. The display 1 is placed on the aforementioned object plane OP, therefore the distance between the display 1 and the first array of microlenses is also larger than the focal length $f_1$ of the first microlens. Preferably, the distance $u_1$ from the aforementioned object plane OP to the first array of microlenses, in the direction of the optical axis OA of the first array of microlenses, is two to thirty times the focal length $f_1$ of the first microlens, for example, the distance $u_1$ is 10 times the focal length $f_1$, or the distance u1 is 20 times the focal length $f_1$, or the distance $u_1$ could be 2, 3, 4, 5, 6, 7, 8, 9, 10, 11, 12, 13, 14, 15, 16, 17, 18, 19, 20, 21, 22, 23, 24, 25, 26, 27, 28, 29, 30 times the focal length f1 of the first microlens.

Figure 7A:
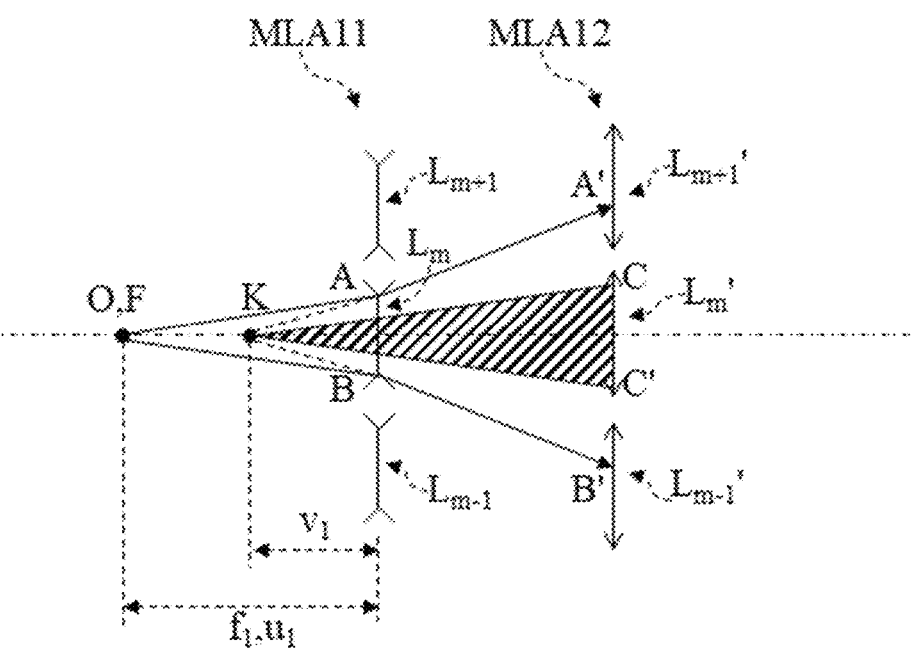
FIG. 7A is a schematic diagram illustrating the case where the object plane OP is placed on the object side focal plane F of the first array of microlenses.

For reference, FIG. 7A shows the case where the object plane OP is placed on the object side focal plane F of the first array of microlenses MLA11. For simplicity, only the intersection point O of the object plane OP and the optical axis OA of the unit lens of the first array of microlenses is shown in FIG. 7A, point O is on the object plane OP. The display 1 is placed on the object plane OP. In this situation, the point O on the display 1 (or the object plane OP) forms a virtual image by the unit lens in the first array of microlenses MLA11, and the virtual image is located in between the display 1 and the first array of microlenses, at a distance $v_1 = f_1/2$ to the unit lens of the first array of microlenses, which is shown as the point K in FIG. 7A. When the first array of microlenses MLA11 is a negative lens array, then $f_1 < 0$, $v_1 < 0$, $u_1 > 0$, $u_1 = -f_1$. When placing the point O of the display 1 on the focal plane F of the unit lens $L_m$ of the first array of microlenses, then point O forms a virtual image at point K. Such, optical energy emitted by point O on the display 1, will reach the second array of microlenses MLA12 spanning from point A' to B', via the aperture AB of the unit lens $L_m$ of the first array of microlenses. In the span A'B', only the optical energy that falls within CC' on the surface of the unit lens $L_m'$ of the second array of microlenses which forms an optical channel pair with the unit lens $L_m$ of the first array of microlens, contributes to the imaging of point O on the display 1. In other words, only the shaded portion of optical energy that emitted by point O on the display 1 that go through the unit lens $L_m$ of first array of microlenses is used for imaging. Other optical energy that is directed to unit lenses $L_{m+1}'$ and $L_{m-1}'$ of the second array of microlenses, causes display crosstalk.

Figure 7B:
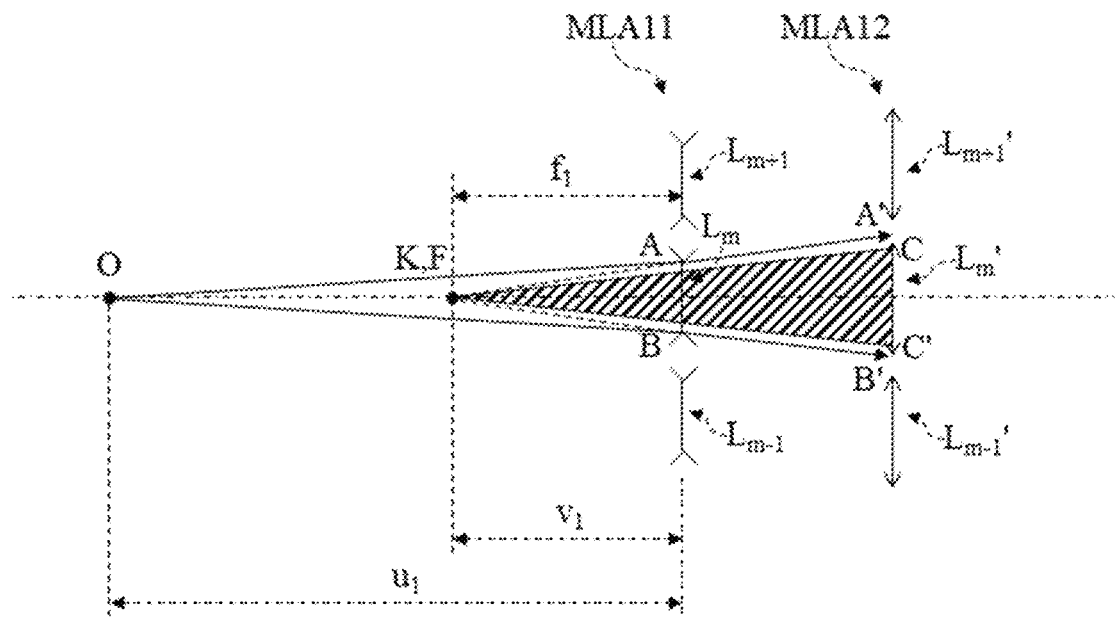
FIG. 7B is a schematic diagram illustrating the case where the object plane OP is placed away from the object side focal plane F of the first array of microlenses.

Based on the current invention, an embodiment is shown in FIG. 7B, as the object plane OP is placed at a distance to the first array of microlenses that is larger than the focal length of the first array of microlenses. For example, the object plane OP is placed at a distance $u_1$ to the first array of microlenses that is two to thirty times the focal length $f_1$ of the first array of microlenses, in other words, $u_1/f_1$ is within the range of [2, 30], which results in that $v_1/f_1$ is within [0.66, 1) range, where $v_1$ is the virtual image distance of point O to the first array of microlenses. In such a configuration, as shown in FIG. 7B, for example, point O is placed at the distance $u_1 = 30f_1$, where $u_1$ is the object distance with reference to unit lens $L_m$ in the first array of microlenses, then point O forms a virtual image at point K, and point K is very close to the focal plane F of the first array of microlenses. Thus, the optical energy emitted by point O that transmitted through the aperture AB of the unit lens $L_m$ of the first array of microlens MLA1 will reach the span A'B' on the second array of microlens MLA12. Within the span A'B', the energy that enters unit lens $L_m$ of second array of microlenses is in the shaded area that is labeled as CC' on the plane of the second array of microlenses MLA12. Compare to FIG. 7A, CC' occupies most of the span A'B' in FIG. 7B, which means that most of the optical energy emitted by point O is directed into the unit lens $L_m'$ of second array of microlenses that forms a corresponding optical channel with the unit lens $L_m$ of first array of microlenses, and very little optical energy emitted by point O enters unit lenses $L_{m+1}'$ and $L_{m-1}'$ of the second array of microlenses, that causes display crosstalk. Such, the embodiment shown in FIG. 7B, significantly reduces display crosstalk and raises the coupling efficiency in the optical channel when compared to the plan shown in FIG. 7A.

As discussed above, the present invention is not limited to utilizing an array of microlenses in a periodic arrangement, and is not limited to a specific form of periodic arrangement. For easy understanding, examples of aperiodic and periodic arrangement that can be used for the first array of microlenses MLA11 and the second array of microlenses MLA12 arranged in an aperiodic and periodic manner in the present embodiment are shown in FIGS. 8A and 8B, respectively, which only serve as an example instead of limitation.

Figure 8A:
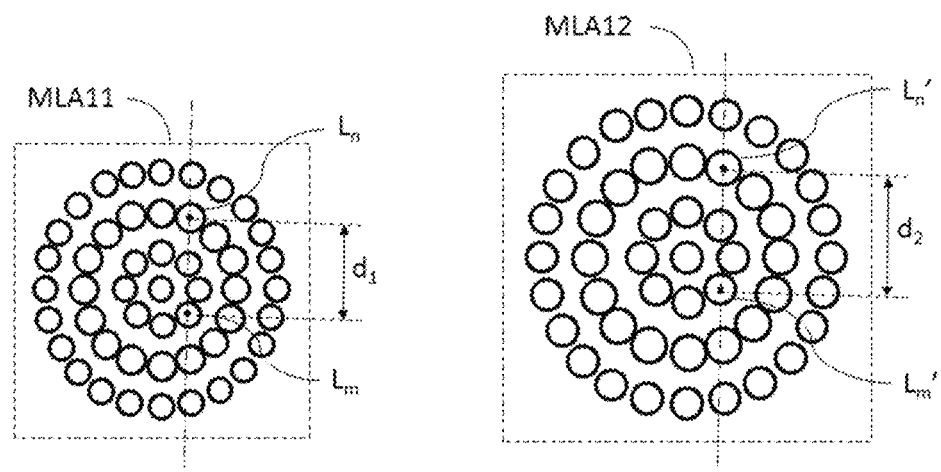
FIG. 8A shows an example of a first array of microlenses and a second array of microlenses arranged aperiodically that can be used for the first embodiment.

FIG. 8A shows an example that can be used for the first array of microlenses and the second array of microlenses in an aperiodic arrangement in the first embodiment. As shown in the figure, first microlenses in the first array of microlenses MLA11 and second microlenses in the second array of microlenses MLA12 are arranged in an one-to-one correspondence (though not shown, this does not exclude that any array of microlenses can include redundant unit microlenses that are not corresponding to the unit microlenses in another array of microlenses). According to the arrangement shown in FIG. 8A, in each of the first array of microlenses MLA11 and the second array of microlenses MLA12, unit microlenses (the first microlenses/the second microlenses) are arranged in concentric circles, instead of in a periodic manner; for any two unit microlenses, such as the first microlenses $L_m$ and $L_n$, or the second microlenses $L_m'$ and $L_n'$, they can be different in diameter. Moreover, it should be understood that the present invention does not require a fixed diameter ratio between the first microlenses and the second microlenses arranged in one-to-one correspondence. For example, a diameter ratio of the first microlens $L_m$ to the second microlens $L_m'$ can be different from that of the first microlens $L_n$ to the second microlens $L_n'$.

Figure 8B:
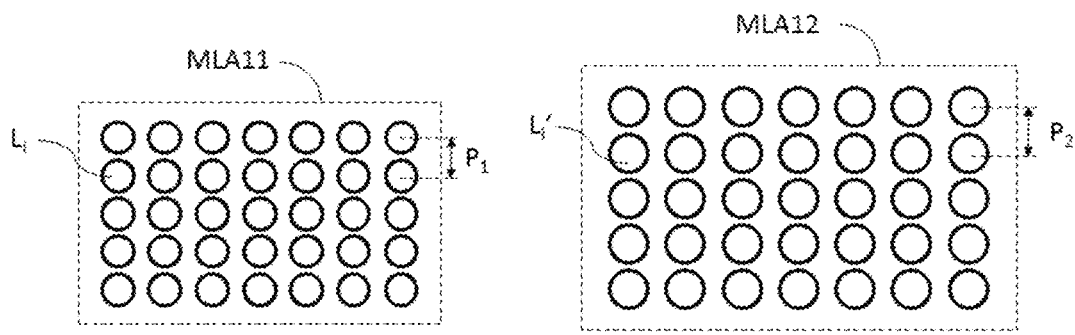
FIG. 8B shows an example of a first array of microlenses and a second array of microlenses arranged periodically that can be used for the first embodiment.

FIG. 8B shows an example that can be used for the first array of microlenses and the second array of microlenses under periodic arrangement in the first embodiment. According to the arrangement shown in FIG. 8B, in each of the first array of microlenses MLA11 and the second array of microlenses MLA12, unit microlenses (the first microlenses/the second microlenses) are arranged periodically in the form of a matrix of rows and columns. Although the unit microlenses in either of the microlens arrays shown in FIG. 8B are the same, this is not necessary.

The rules discussed above in conjunction with FIG. 4 are applicable to this embodiment, namely, for multiple optical channels formed between the first array of microlenses MLA11 and the second array of microlenses MLA12, a distance $d_1$ between the first microlenses $L_m$ and $L_n$ and a distance $d_2$ between the second microlenses $L_m'$ and $L_n'$ in any two different optical channels satisfy the relation expression (3), namely:

$$d_2 = d_1\left(1 + \frac{v_1}{u_1}\right)$$

where $u_1$ is an object distance from the display surface of the display to the first array of microlenses, and $v_1$ is an image distance from the image plane to the first array of microlenses; furthermore, $u_1$ is positive when the object is a real object relative to the first microlens, $u_1$ is negative when the object is a virtual object relative to the first microlens, $v_1$ is positive when the first microlens forms a real image, and $v_1$ is negative when the first microlens forms a virtual image.

In the first embodiment, the display surface of the display is a real object relative to the first microlenses, the object distance $u_1$ is positive, the first microlenses form a real image (see the following description made in conjunction with FIG. 10) and the image distance $v_1$ is positive.

Figure 9:
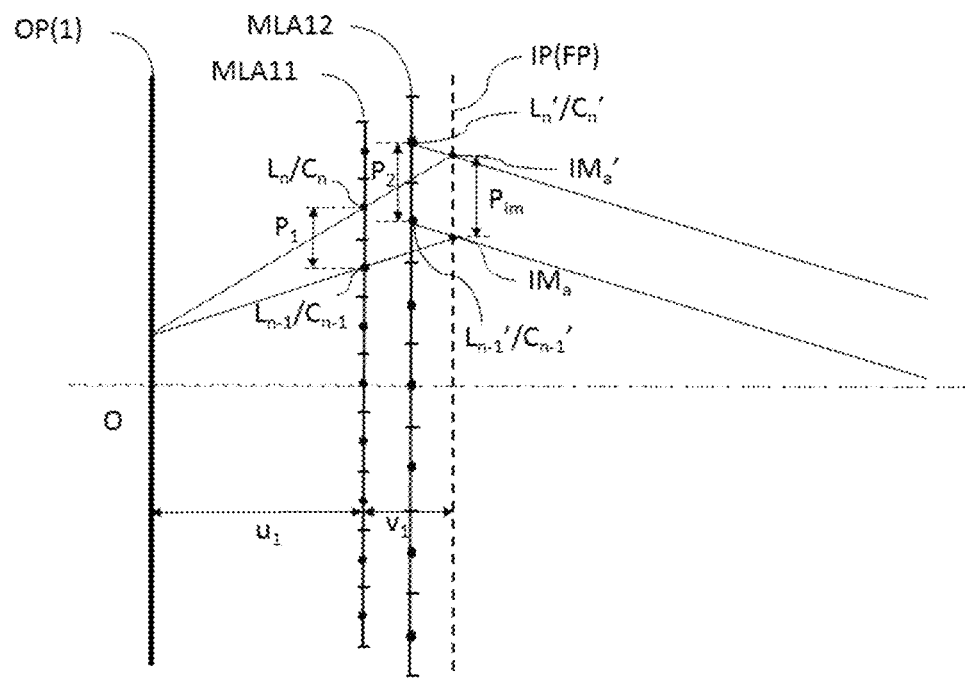
FIG. 9 illustrates the relative relation between the arrangement periods of unit microlenses in the first array of microlenses and the second array of microlenses in the first embodiment.

For the first array of microlenses MLA11 and the second array of microlenses MLA12 arranged periodically as shown in FIG. 8B, the rules discussed with reference to FIG. 4 can be further deduced into the relation between the arrangement periods of the two arrays of microlenses as shown in FIG. 9. By this, considering any two adjacent optical channels, a distance $d_1$ between the first microlenses $L_n$ and $L_{n-1}$ in the two optical channels is an arrangement period $P_1$ for a plurality of first microlenses in a direction of a line connecting the first microlenses $L_n$ and $L_{n-1}$, a distance $d_{im}$ between image points $IM_a$ and $IM_a'$ formed by the first microlenses $L_n$ and $L_{n-1}$ is a period $P_{im}$ for an array of image points in the direction, and a distance $d_2$ between the second microlenses $L_n'$ and $L_{n-1}'$ to which the first microlenses $L_n$ and $L_{n-1}$ correspond is a period $P_2$ for the second array of microlenses in the direction, all satisfying the following relations:

$$P_{im} = P_1\left(1 + \frac{v_1}{u_1}\right) \quad (4)$$

$$P_{im} = P_2 \quad (5)$$

$$P_2 = P_1\left(1 + \frac{v_1}{u_1}\right) \quad (6)$$

$$\frac{v_1}{u_1}$$

can also be expressed as a magnification $M_1$ of the first microlenses corresponding to the object plane OP, namely, $$M_1 = \frac{v_1}{u_1},$$

so the above relation expression (6) can also be expressed as:

$$P_2 = P_1(1+M_1) \quad (7)$$

Where $P_1$ is an arrangement period of the plurality of first microlenses in the first array of microlenses in a direction, $P_2$ is an arrangement period of the plurality of second microlenses in the second array of microlenses in the direction, and $M_1$ is a magnification of the display surface of the display by the first microlenses, namely, $$M_1 = \frac{v_1}{u_1}.$$

According to an preferred embodiment, the plurality of second microlenses are positive lenses, and the plurality of first microlenses form an upright image of the object, the plurality of first microlenses are negative lenses, and the plurality of first microlenses form a shrinked virtual image of the object between the object and the first array of microlenses, the first array of microlenses and the second array of microlenses satisfy P1>P2, wherein P1 is an arrangement period of the plurality of first microlenses of the first array of microlenses in a direction, P2 is an arrangement period of the plurality of second microlenses of the second array of microlenses in the direction.

According to another preferred embodiment, the plurality of second microlenses are negative lenses, and the plurality of first microlenses form an inverted image of the object, the plurality of first microlenses are positive lenses, and the plurality of first microlenses form a shrinked real image on a side of the second array of microlenses opposite to the first array of microlenses, the first array of microlenses and the second array of microlenses satisfy P1<P2, wherein P1 is an arrangement period of the plurality of first microlenses of the first array of microlenses in a direction, P2 is an arrangement period of the plurality of second microlenses of the second array of microlenses in the direction.

In the first embodiment, the display surface of the display forms a real object relative to the first microlenses, and the first microlenses form a real image (see the description made below in conjunction with FIG. 10). Therefore, both the object distance $u_1$ and the image distance $v_1$ are positive, and $M_1$ is positive. Therefore, the arrangement distance $d_2$/period $P_2$ of the second microlenses is larger than the arrangement distance $d_1$/period $P_1$ of the first microlenses in the same direction, as shown in FIGS. 8A and 8B.

In this embodiment, if the first and second arrays of microlenses under aperiodic arrangement satisfy the aforesaid relation expression (3), or the first and second arrays of microlenses under periodic arrangement satisfy the aforesaid relation expression (6) or (7), then corresponding to one and the same point on the object plane OP (the display surface of the display 1), the parallel light beams projected from different optical channels are parallel to each other.

According to the embodiment of the present invention, when the lens arrangement period $P_1$ of the first array of microlenses and the lens arrangement period $P_2$ of the second array of microlenses satisfy the following relation $P_2=P_1(1+M_1)$, the angular magnification of the virtual image of the object to the object is 1, which also means that the viewing angle of a point on the object directly to the observer at a designated distance, is equal to the viewing angle of the virtual image to the observer at the designated distance via the imaging system composed of two microlens arrays mentioned in the embodiment. The details will be described in FIG. 8C.

Figure 8C:
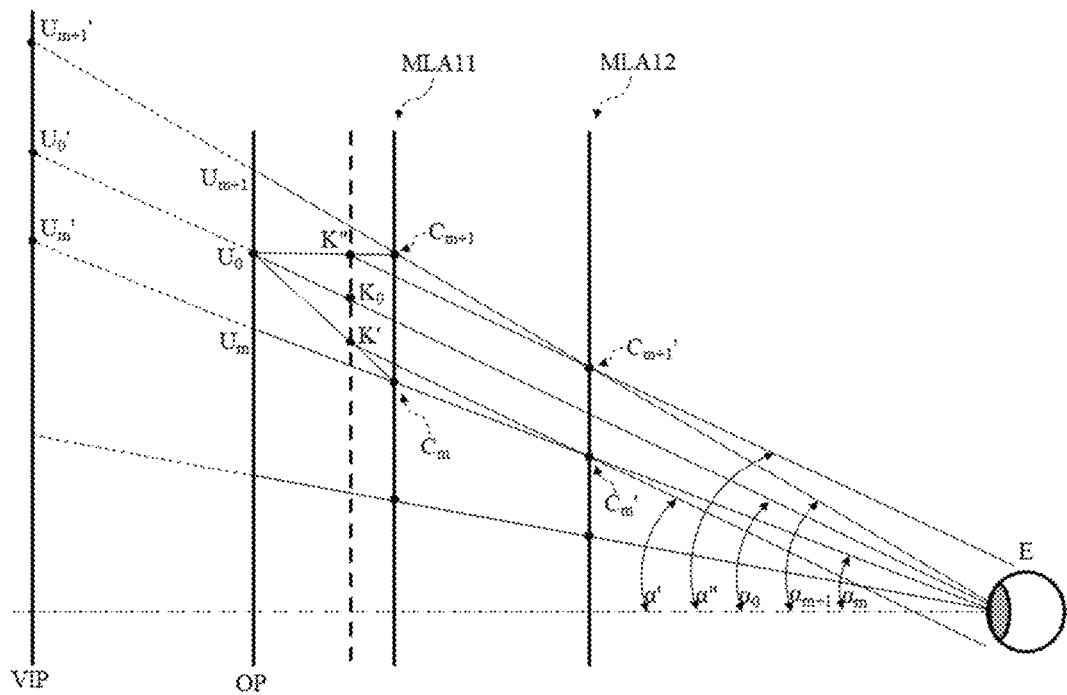
FIG. 8C shows the viewing angle of the point on the object plane to the eye.

As shown in FIG. 8C, the three points on the object plane, $U_o$、$U_m$、$U_{m+1}$ forms virtual images $U_o'$、$U_m'$、$U_{m+1}'$, via the near eye display device 10. The viewing angle of the point $U_o$ on the object plane to the eye, and the viewing angle of the virtual image $U_o'$ to the eye, are the same. Such is true also for the pair of the point $U_m$ and the virtual image $U_m'$, and for the pair of the point $U_{m+1}$ and the virtual image $U_{m+1}'$. The aforementioned relation of $P_2=P_1(1+M_1)$ ensures that $K''K'=C_{m+1}'C_m'$, where $K''K'=(1+M_1)C_{m+1}C_m=(1+M_1)P_1$, $C_{m+1}'C_m'=P_2$. The relation $K''K'=C_{m+1}'C_m'$ in turn ensures that the three rays from the point $U_o$ that pass through the three points $K''$, $K_o$ and $K'$ have same angle with reference to the optical axis, and equal to $\alpha U_o$. In FIG. 8C, reference signs $C_{m+1}$ and $C_m$ are the optical centers of the unit lenses $L_{m+1}$ and $L_m$ of first array of microlenses; reference signs $C_{m+1}'$ and $C_m'$ are the optical centers of the unit lenses $L_{m+1}'$ and $L_m'$ of second array of microlenses; E is the pupil location of the observer; $K''$ and $K'$ are the images of the point $U_o$ on the object plane formed by unit lenses $L_{m+1}$ and $L_m$ of the first array of microlenses; $U_o'$ is the virtual image of $U_o$. $U_{m+1}$ and $U_m$ are special points on the object plane, where points $C_{m+1}$ and $C_{m+1}'$ are on the line of $U_{m+1}E$, and points $C_m$ and $C_m'$ are on the line of $U_mE$. points $U_{m+1}'$ and $U_m'$ are the virtual images of points $U_{m+1}$ and $U_m$ on the object plane, and point $U_{m+1}'$ is also on the line of $U_{m+1}E$, and point $U_m'$ is also on the line of $U_mE$.

As an embodiment of the present invention, the equivalent focal length F of the near eye display system, is defined as $F=f_2+u_1(1+M_1)=f_2+(p_2/p_1)u_1$, where $f_2$ is the focal length of the unit lens in the second array of microlenses.

Figure 8D:
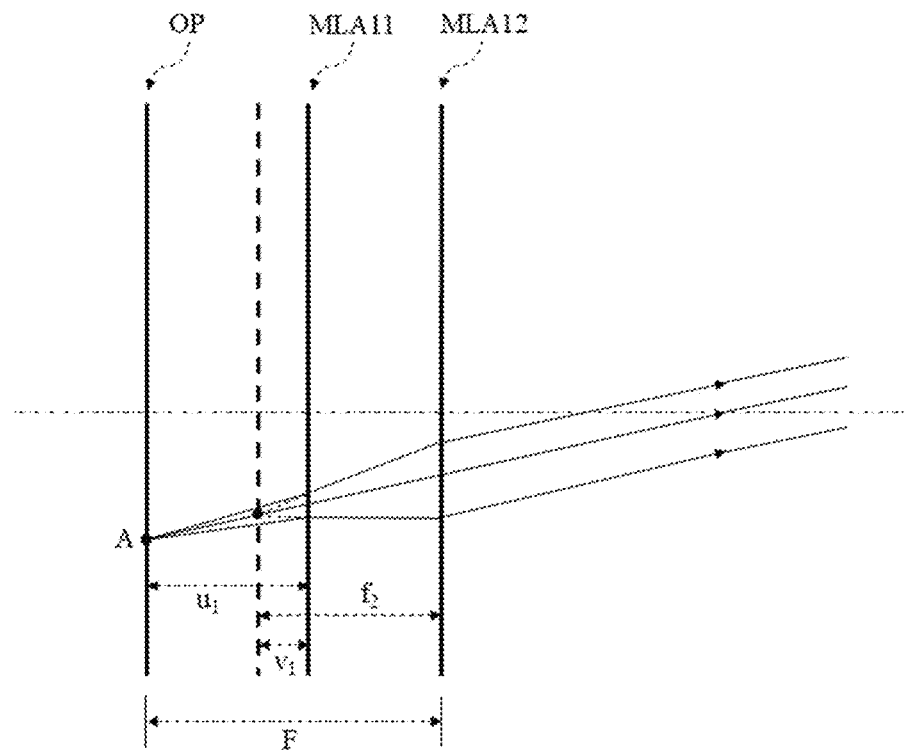
FIG. 8D illustrates the definition and the derivation of the equivalent focal length of the near eye display system.

FIG. 8D explains the definition and the derivation of the aforementioned equivalent focal length F of the near eye display system. Assume that point A is a point on the object plane OP, which is placed on the equivalent focal plane of the near eye display system, then the rays from point A will turn into parallel rays after they have gone through the main optical plane of the near eye display system. Such that the F of a near eye display system is defined as:

$$F=f_2+u_1+v_1$$

Where $f_2$ is the focal length of the unit lens of the second array of microlenses, and $u_1$ being object distance of the object to the first microlens array, and $v_1$ being the image distance from the first array of microlens, where $v_1$ is positive when image is real, and negative when image is virtual.

We take the example of first array of microlenses being all negative lens, and second array of microlenses being all positive lens, then the equivalent focal length F can be further written as $$F=f_2+u_1(1+M_1)=f_2+(P_2/P_1)u_1$$

Where $M_1$ is the magnification of unit lens of first array of microlenses, $P_2$ and $P_1$ is arrangement period of adjacent lens of the second array of microlenses and the first array of microlenses.

Figure 10:
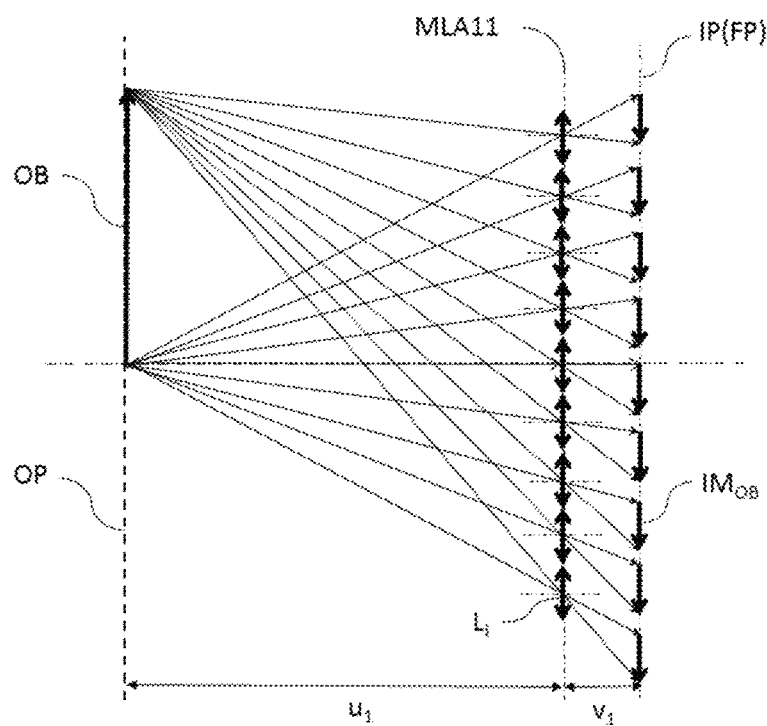
FIG. 10 is a schematic diagram of imaging of the first array of microlenses in the first embodiment.
Figure 11A:
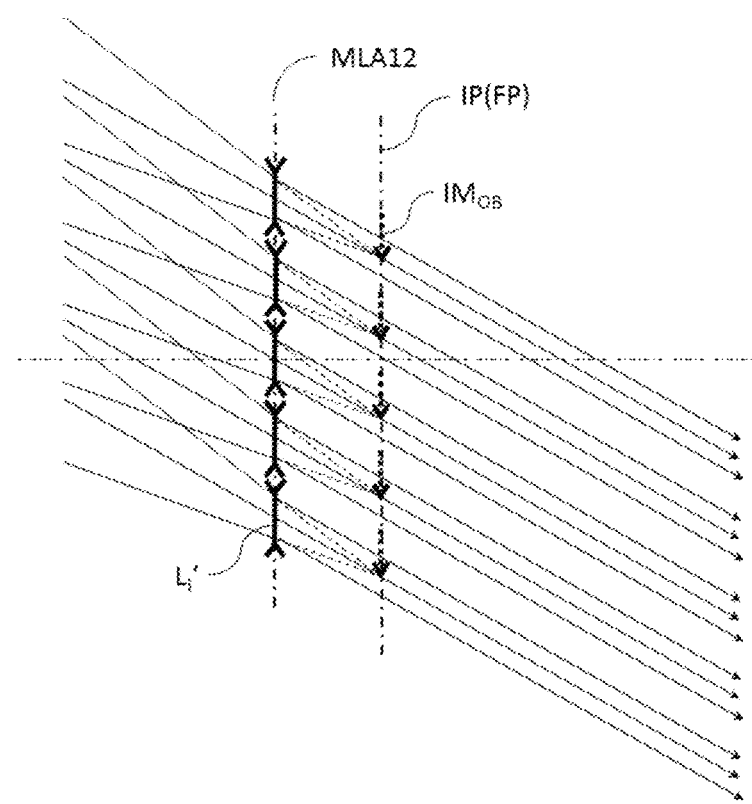
FIGS. 11A and 11B schematically show the situation where multiple images formed by the first microlenses are projected through a corresponding second microlens respectively in the first embodiment.
Figure 11B:
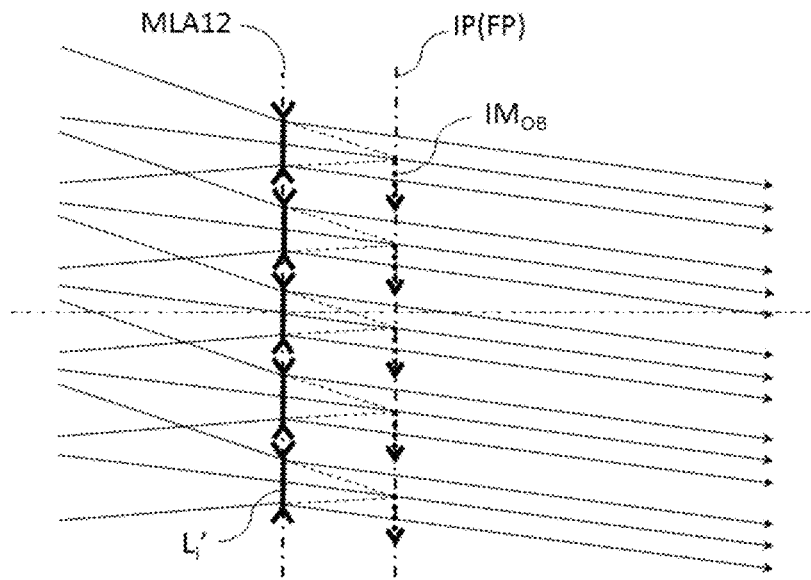

FIGS. 10 to 12 schematically illustrate imaging of different points on the object plane (the display surface of the display 1) by the near-eye display device 10/the near-eye optical imaging system according to the embodiment. In FIG. 10 and FIGS. 11A and 11B, in order to more clearly illustrate the relative position relation of the points on the object plane (the display surface of the display 1), the display 1 is replaced with an object with a direction (an arrow) OB located on the object plane OP.

FIG. 10 is a schematic diagram of imaging of the first array of microlenses MLA11 in the first embodiment. It can be seen that the plurality of first microlenses $L_i$ image the object OB located on the object plane OP, respectively to obtain images $IM_{OB}$ on the image plane IP in the same number as that of the first microlenses, and each of the images is an inverted real image. Although for the sake of clarity, various images shown in FIG. 10 do not overlap with each other, it should be noted that the images formed by the plurality of first microlenses also can overlap with each other, and the present invention makes no limitation in this regard. Preferably, images $IM_{OB}$ formed by respective first microlenses $L_i$ are inverted and shrinked real images.

By referring back to FIG. 7, the image plane IP of the first array of microlenses MLA11 coincides with the object side plane FP of the second array of microlenses MLA12 as a negative lens array, so the second array of microlenses MLA12 is located between the first array of microlenses MLA11 and the image plane IP in terms of spatial relation. This means that light passing through the first array of microlenses MLA11 is incident on the second array of microlenses MLA12 before reaching the image plane IP, and, for the second microlenses, forms a virtual object (the same as the image $IM_{OB}$) on the object side focal plane FP thereof.

According to the imaging rules of a negative lens, light converging towards any point on the object side focal plane is incident to the negative lens, from which a parallel light beam exits, and the angle of the parallel light beam emergent from the negative lens varies along with the position of the point. FIGS. 11A and 11B schematically show the situation where multiple images $IM_{OB}$ are projected through a corresponding second microlens $L_i'$ respectively in this embodiment. FIG. 11A shows parallel light beams projected from the respectively corresponding second microlenses $L_i'$, corresponding to the top vertex of the object OB (the top of the arrow); and FIG. 11B shows parallel light beams projected from the respectively corresponding second microlenses $L_i'$, corresponding to the bottom vertex of the object OB (the bottom of the arrow). By comparing FIG. 11A with FIG. 11B, it can be found that the parallel light beams projected from the corresponding second microlenses in correspondence to the top vertex of the object OB (the top of the arrow) have a larger angle of elevation, such that the top vertex of the object OB will be imaged to a point at a relatively high position on the plane at infinity; and the parallel light beams projected from the corresponding second microlenses in correspondence to the bottom vertex of the object OB (the bottom of the arrow) have a smaller angle of elevation, such that the bottom vertex of the object OB will be imaged to a point at a relatively low position on the plane at infinity. This means that points at different positions on the object plane OP can be imaged in a correct position relation by means of the near-eye optical imaging system according to the embodiment.

Figure 12A:
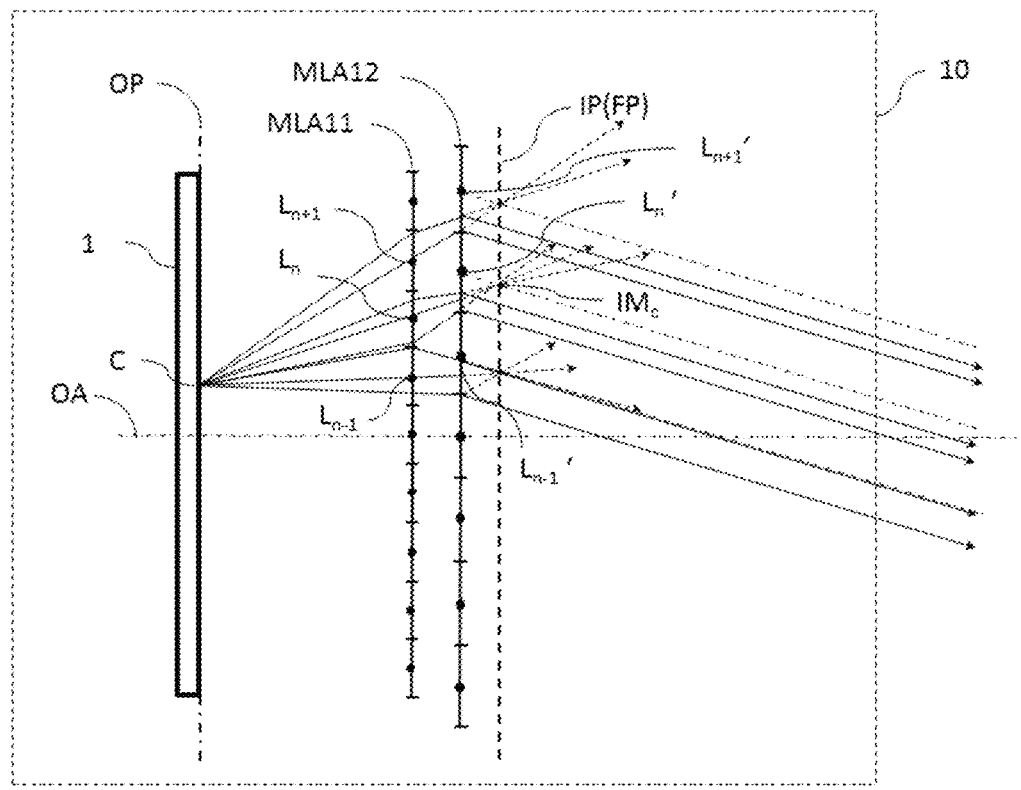
FIGS. 12A and 12B are schematic diagrams of imaging of two points at different positions on the display through multiple optical channels respectively in the first embodiment.
Figure 12B:
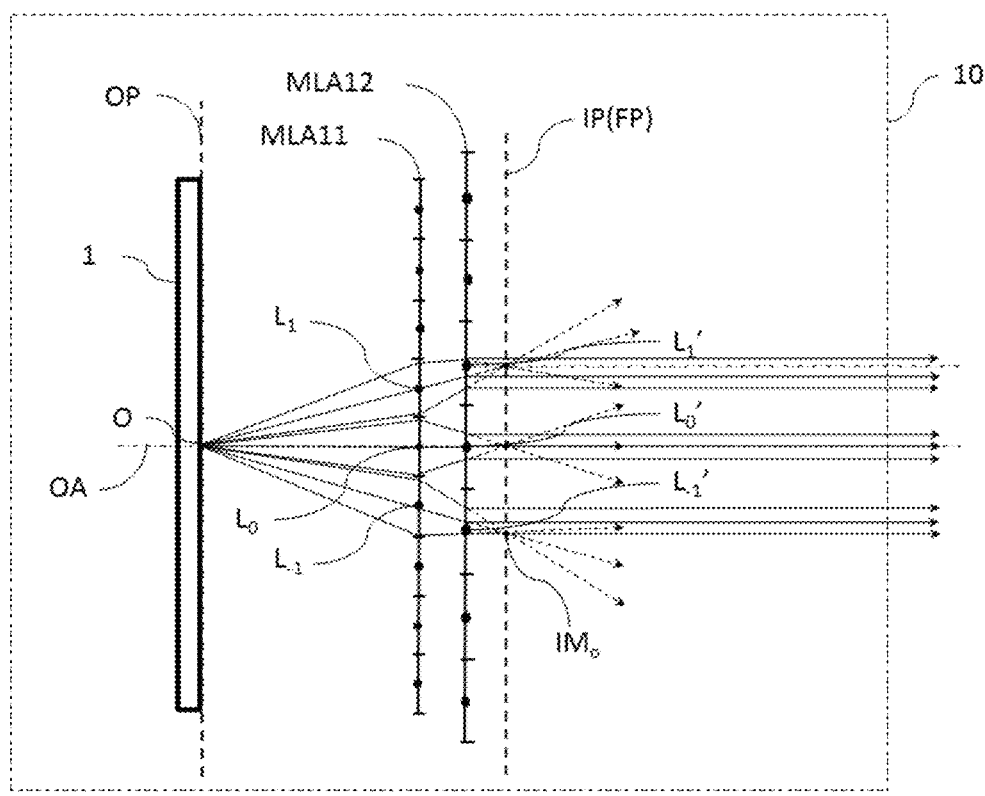

FIGS. 12A and 12B each show imaging of two points at different positions on the display surface of the display 1 through multiple optical channels by means of the near-eye display device 10 according to the first embodiment of the present invention. FIG. 12A shows that any point C on the display surface deviating from the optical axis OA projects multiple parallel light beams parallel to each other through the optical channels formed by both the plurality of first microlenses $L_{n-1}$, $L_n$, $L_{n+1}$ in the first array of microlenses MLA11 and the corresponding plurality of second microlenses $L_{n-1}'$, $L_n'$, $L_{n+1}'$ in the second array of microlenses MLA12. FIG. 12B shows that point O on the display surface located on the optical axis OA projects multiple parallel light beams parallel to each other through the optical channels formed by both the plurality of first microlenses $L_{-1}$, $L_0$, $L_1$ in the first array of microlenses MLA11 and the corresponding plurality of second microlenses $L_{-1}'$, $L_0'$, $L_1'$ in the second array of microlenses MLA12. It should be noted that the number and position of the optical channels for projecting light from the same point as shown in FIGS. 12A and 12B are not restrictive, but exemplary.

With reference to FIGS. 10 to 12, it can be seen that the near-eye display device 10/the near-eye optical imaging system according to the first embodiment of the present invention can image the display surface (the object plane) of the display located within a near-eye range onto a plane at infinity in a correct position relation.

It should be noted that when the display is larger in size and the first and second array of microlenses are larger in size correspondingly, it is easy to generate aberration at those microlenses in the first array of microlenses and/or the second array of microlenses which are far away from the optical axis OA. In order to eliminate or reduce the aberration generated in this case, some tiny changes or chirps can be introduced into some ideal parameters or features of the first and second arrays of microlenses. For example, in the case where the arrays of microlenses are fabricated on a substrate, the surface of the substrate for carrying the arrays of microlenses may not be a plane, but for example a curved or stepped surface, so as to enable the microlenses to be at slightly inconsistent positions in the optical axis direction. This may bring about subtle changes to the coplanarity of the image planes of the first array of microlenses, or to the coplanarity of the focal planes of the second array of microlenses. For another example, the thickness of the substrate for carrying the arrays of microlenses in the direction parallel to the optical axis can be varied slightly, thereby introducing a certain amount of additional refractive power. Moreover, the focal length of microlenses in an array of microlenses also can be adjusted to be slightly different, or minor changes can be introduced into the spacing of microlenses (e.g. the arrangement period in the case of microlenses arranged periodically). It is to be noted that the presence of such minor changes or chirps in parameters or features does not alter the implementation of the technical solution of the first embodiment of the present invention as described above. In other words, despite the aforesaid minor changes or chirps to the parameters or features, they still belong to the technical solutions constructed according to the aforesaid embodiment from the perspective of the technical solution concerning the near-eye display device or the near-eye optical imaging system. The aforesaid cases are also tenable for the second embodiment to be described below or other possible embodiments of the present invention though not detailed herein.

Figures 13A, 13B:
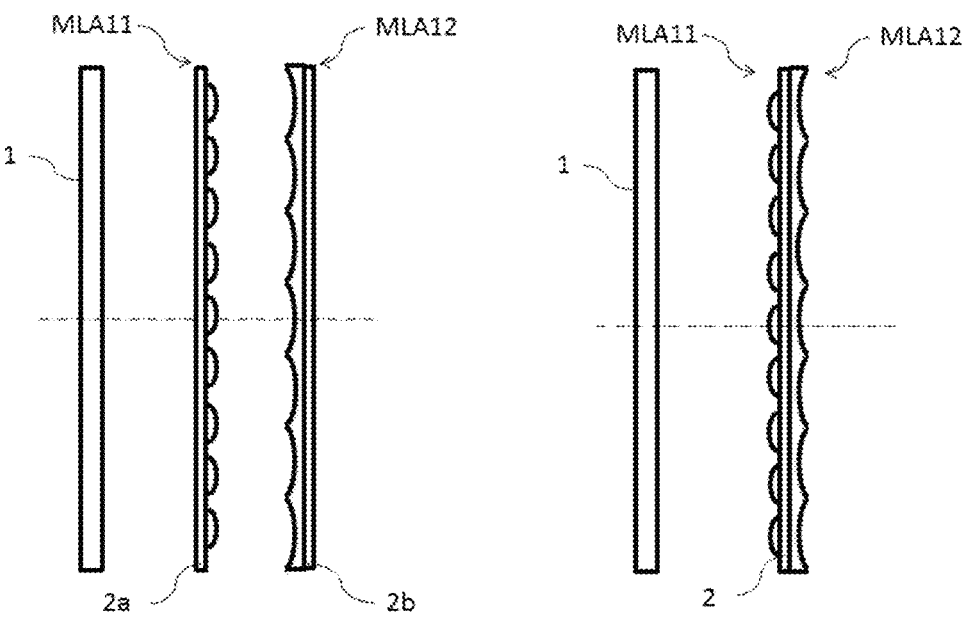
FIGS. 13A and 13B show exemplary structures of the first array of microlenses and the second array of microlenses that can be used for the first embodiment.

Various structures can be adopted for the first array of microlenses MLA11 and the second array of microlenses MLA12. For example, they can be carried/fabricated on different substrates respectively, or can be carried/fabricated on the same substrate. For example, as shown in FIG. 13A, the first array of microlenses MLA11 and the second array of microlenses MLA12 can be formed on the surfaces of two substrates 2a and 2b facing each other respectively. In this configuration, an air gap exists between the first array of microlenses MLA11 and the second array of microlenses MLA12, which is advantageous to avoid aberration being introduced due to the refraction of other materials, in comparison with the case where other materials (e.g. a substrate) are interposed therebetween. In the example shown in FIG. 13B, the first array of microlenses MLA11 and the second array of microlenses MLA12 are formed on two surfaces opposite to each other of the same substrate 2. Such a configuration is in favor of controlling the distance between the first and second arrays of microlenses, facilitating assembly. In other structures, the first array of microlenses MLA11 and the second array of microlenses MLA12 may be, for example, located on the surfaces opposite to each other of different substrates. The present invention is not limited in this respect.

The Second Embodiment

A near-eye optical imaging system and near-eye display device 20 according to the second embodiment of the present invention will be described below in conjunction with FIGS. 14 to 19.

Figure 14:
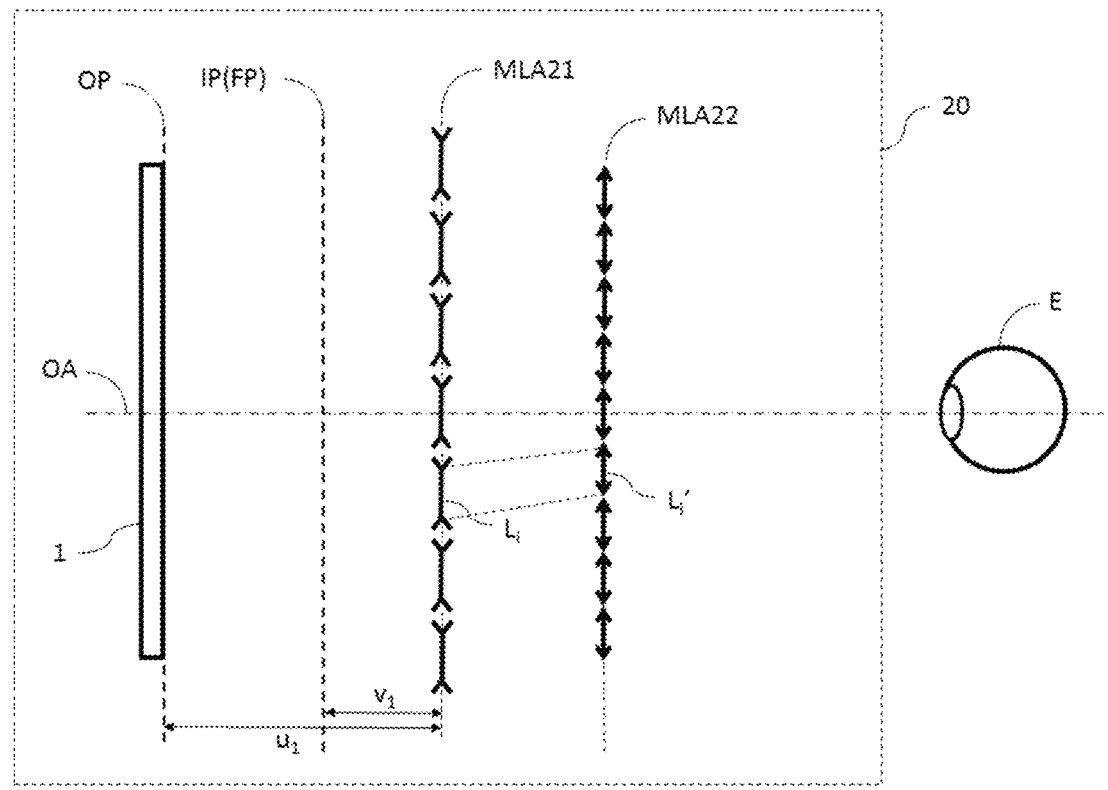
FIG. 14 is a schematic diagram of a near-eye optical imaging system and a near-eye display device according to the second embodiment of the present invention.

As shown in FIG. 14, the near-eye display device 20 comprises a display 1, a first array of microlenses MLA21 arranged on the display surface side of the display 1, and a second array of microlenses MLA22 arranged on a side of the first array of microlenses MLA21 opposite to the display 1. Except the display 1, other parts of the near-eye display device 20 can constitute a near-eye optical imaging system according to the second embodiment of the present invention.

The difference between the near-eye display device 20 according to the second embodiment and the near-eye display device 10 according to the first embodiment lies in that in the near-eye display device 20, the plurality of first microlenses $L_i$ included in the first array of microlenses MLA21 are negative lenses with the same negative refractive power, and the plurality of second microlenses $L_i'$ included in the second array of microlenses MLA22 are positive lenses with the same positive refractive power. This is contrary to the case of the near-eye display device 10.

Similarly, an optical axis OA of the near-eye display device 20 is parallel to the optical axis of each unit microlens (i.e. individual first microlens and second microlens) in the first array of microlenses MLA21 and the second array of microlenses MLA22, and extends through a target projection position. The plurality of first microlenses $L_i$ in the first array of microlenses MLA21 correspond to a second microlens $L_i'$ in the second array of microlenses MLA22 respectively, to form multiple optical channels $CH_i$ to project parallel light at an appropriate angle to the target projection position, corresponding to any point on the display surface of the display 1.

As shown in FIG. 14, the respective image planes of the plurality of first microlenses of the first array of microlenses MLA21, which conjugate with an object plane OP (the display surface of the display 1) are coplanar with each other, i.e. image planes IP. The plurality of second microlenses of the second array of microlenses MLA22 have object side focal planes FP coplanar with each other, which coincide with the aforesaid image planes IP. Unlike the near-eye display device 10 according to the first embodiment, since the first microlenses are negative lenses and the second microlenses are positive lenses, the image planes IP/the object side focal planes FP are located between the display 1 and the first array of microlenses MLA21 as shown in the figure. In this way, corresponding to any point on the display surface of the display 1, parallel light beams are projected from each second microlens.

Figure 15A:
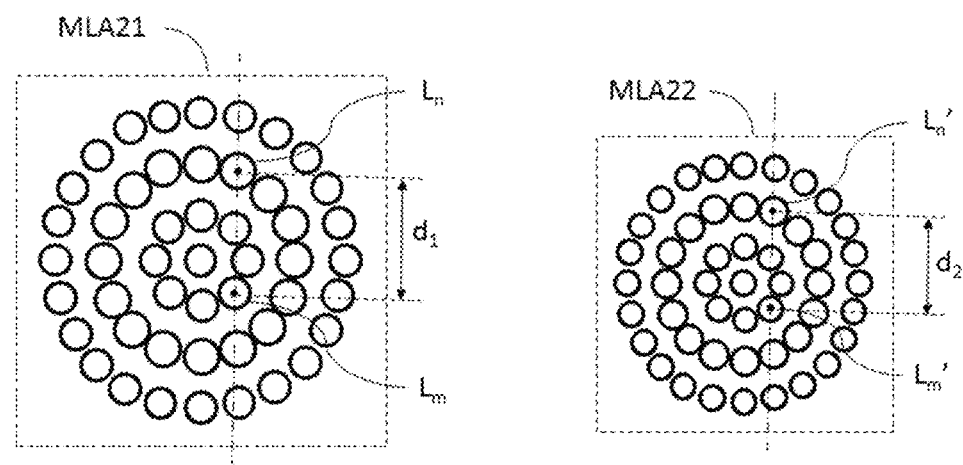
FIG. 15A shows an example of a first array of microlenses and a second array of microlenses arranged aperiodically that can be used for the second embodiment.
Figure 15B:
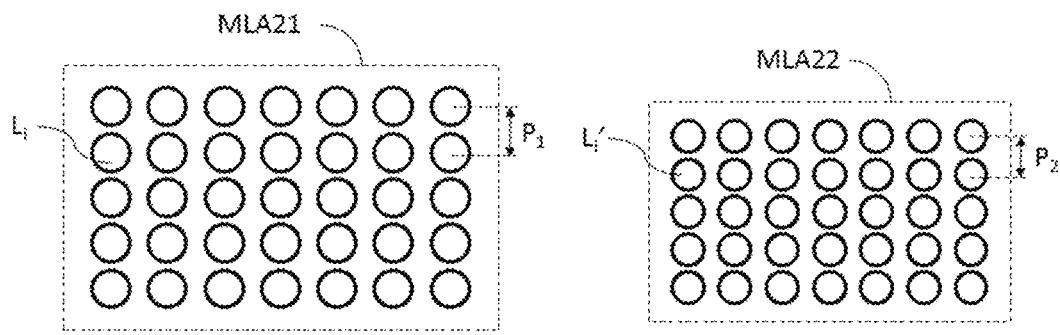
FIG. 15B shows an example of a first array of microlenses and a second array of microlenses arranged periodically that can be used for the second embodiment.

FIGS. 15A and 15B each show an example that can be used for aperiodic and periodic arrangement of the first array of microlenses MLA21 and the second array of microlenses MLA22 under aperiodic and periodic arrangement in the second embodiment. By comparing FIGS. 15A and 15B with FIGS. 8A and 8B, it can be found that the first array of microlenses MLA21 and the second array of microlenses MLA22 in the second embodiment can be arranged in the same way as the first array of microlenses MLA11 and the second array of microlenses MLA12 in the first embodiment. The aforesaid description of the arrangement of the first and second arrays of microlenses with reference to FIGS. 8A and 8B is also applicable to the first array of microlenses MLA21 and the second array of microlenses MLA22 in the second embodiment. For the sake of brevity, no more description will be provided here.

By comparing FIGS. 15A and 15B with FIGS. 8A and 8B, it also can be found that in the first embodiment, the arrangement distance $d_2$/period $P_2$ of the second microlenses is larger than the arrangement distance $d_1$/period $P_1$ of the first microlenses in the same direction; however, in the second embodiment, the arrangement distance $d_2$/period $P_2$ of the second microlenses is smaller than the arrangement distance $d_1$/period $P_1$ of the first microlenses in the same direction. In this regard, the detailed description will be made below in conjunction with FIGS. 16A and 16B.

Figure 16A:
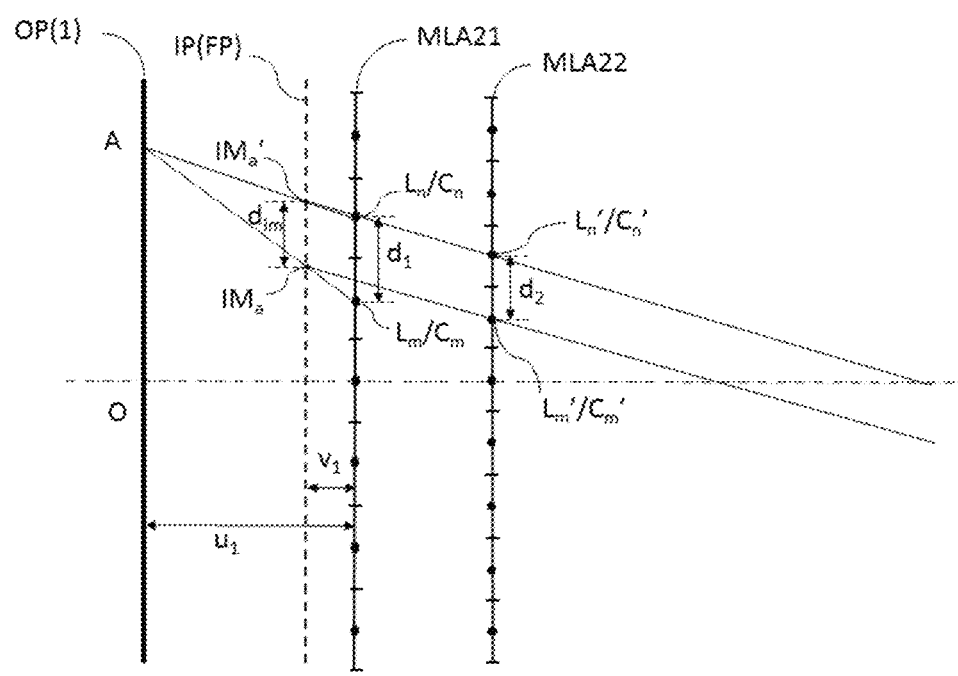
FIG. 16A illustrates the relative relation between the arrangement distances of unit microlenses in the first array of microlenses and the second array of microlenses in the second embodiment.

FIG. 16A illustrates the relative relation between the arrangement distances of the unit microlenses in the first array of microlenses MLA21 and the second array of microlenses MLA22 in the second embodiment.

Similar to FIG. 4, FIG. 16A shows that point A is imaged by two first microlenses $L_m$ and $L_n$ respectively to obtain two image points $IM_a$ and $IM_a'$, and the two image points $IM_a$ and $IM_a'$ are located on the image plane IP. It can be seen that the object distances are equal, both being $u_1$, and the image distances are equal, both being $v_1$, in the process of imaging point A through the two first microlenses $L_m$ and $L_n$, respectively. Accordingly, based on the relation of similar triangles, a distance $d_{im}$ between the image points $IM_a$ and $IM_a'$ and a distance $d_1$ between the two first microlenses $L_m$ and $L_n$ (i.e. the distance between the optical centers $C_m$ and $C_n$ of the two first microlenses) satisfy the relation expression (1), namely:

$$d_{im} = d_1\left(1 + \frac{v_1}{u_1}\right) \qquad (1)$$

where $u_1$ is an object distance from the display surface of the display to the first array of microlenses, and $v_1$ is an image distance from the image plane to the first array of microlenses; furthermore, $u_1$ is positive when the object is a real object relative to the first microlens, $u_1$ is negative when the object is a virtual object relative to the first microlens, $v_1$ is positive when the first microlens forms a real image, and $v_1$ is negative when the first microlens forms a virtual image.

In the second embodiment, the display surface of the display forms a real object relative to the first microlenses, the object distance $u_1$ is positive, the first microlens forms a virtual image (see the description made below in conjunction with FIG. 17), and the image distance $v_1$ is negative.

In the illustrated example, in order to enable light from point A to form two parallel light beams parallel to each other after passing through an optical channel formed by the first microlens $L_n$ and the second microlens $L_n'$ and through an optical channel formed by the first microlens $L_m$ and the second microlens $L_m'$, a distance $d_2$ between the second microlenses $L_m'$ and $L_n'$ (i.e. the distance between the optical centers $C_m'$ and $C_n'$ of the two second microlenses) should be maintained equal to a distance $d_{im}$ between the image points $IM_a$ and $IM_a'$, namely satisfying the relation expression (2):

$$d_{im} = d_2 \qquad (2)$$

Therefore, in any two different optical channels, a distance $d_1$ between the first microlenses $L_m$ and $L_n$ and a distance $d_2$ between the second microlenses $L_m'$ and $L_n'$ satisfy the relation expression (3):

$$d_2 = d_1\left(1 + \frac{v_1}{u_1}\right) \qquad (3)$$

Figure 16B:
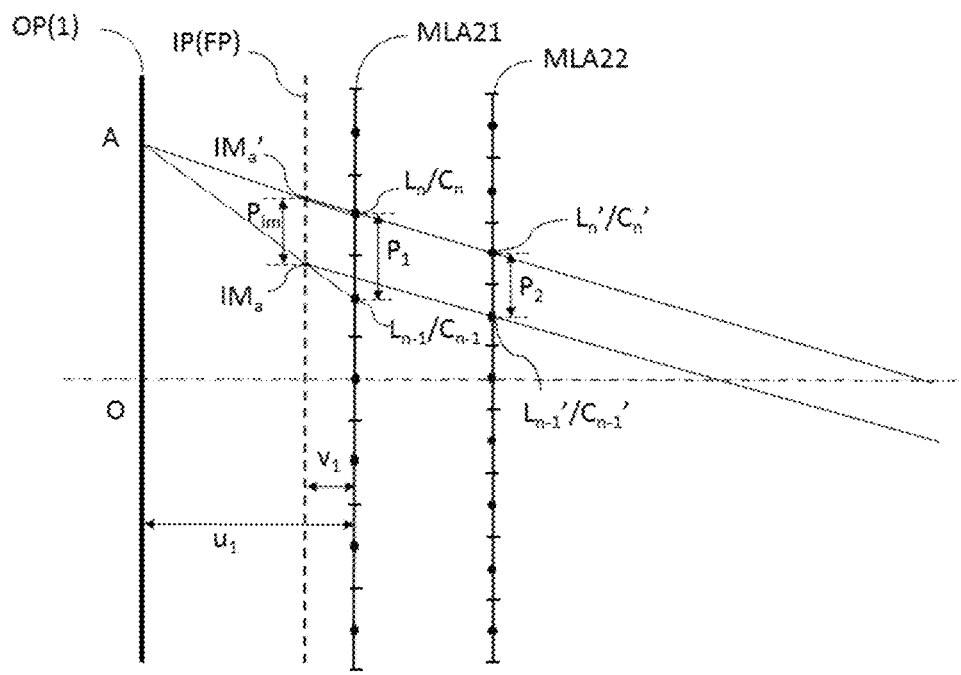
FIG. 16B illustrates the relative relation between the arrangement periods of unit microlenses in the first array of microlenses and the second array of microlenses in the second embodiment.

FIG. 16B illustrates the relative relation between the arrangement periods of the first and second arrays of microlenses in the second embodiment. Similar to FIG. 9, FIG. 16B shows that for the first array of microlenses MLA21 and the second array of microlenses MLA22 under periodic arrangement, considering any two adjacent optical channels, a distance $d_1$ between the first microlenses $L_n$ and $L_{n-1}$ in the two optical channels is an arrangement period $P_1$ for a plurality of first microlenses in a direction of a line connecting the first microlenses $L_n$ and $L_{n-1}$, a distance $d_{im}$ between the image points $IM_a$ and $IM_a'$ formed by the first microlenses $L_n$ and $L_{n-1}$ is a period $P_{im}$ for an array of image points in the direction, and a distance $d_2$ between the second microlenses $L_n'$ and $L_{n-1}'$ to which the first microlenses $L_n$ and $L_{n-1}$ correspond is a period $P_2$ for the second array of microlenses in the direction, all satisfying the following relation expressions (4) to (6):

$$P_{im} = P_1\left(1 + \frac{v_1}{u_1}\right) \qquad (4)$$

$$P_{im} = P_2 \qquad (5)$$

$$P_2 = P_1\left(1 + \frac{v_1}{u_1}\right) \qquad (6)$$

The aforesaid relation expression (6) can also be expressed as a relation expression (7), namely:

$$P_2 = P_1(1 + M_1) \qquad (7)$$

Where $P_1$ is an arrangement period of the plurality of first microlenses in the first array of microlenses in a direction, $P_2$ is an arrangement period of the plurality of second microlenses in the second array of microlenses in the direction, and $M_1$ is a magnification of the display surface of the display by the first microlenses, namely, $$M_1 = \frac{v_1}{u_1}.$$

In the second embodiment, the display surface of the display forms a real object relative to the first microlenses, and the first microlenses form a virtual image (see the description made below in conjunction with FIG. 17). Therefore, the object distance $u_1$ is positive, the image distance $v_1$ is negative, and M1 is negative. Therefore, the arrangement distance $d_2$/period $P_2$ of the second microlenses is smaller than the arrangement distance $d_1$/period $P_1$ of the first microlenses in the same direction, as shown in FIGS. 15A and 15B.

According to FIGS. 16A and 16B, as well as the discussion made above, it can be seen that the relation between the arrangement distance/period of the first array of microlenses and the second array of microlenses discussed above with reference to FIGS. 4 and 9 (see the relation expressions (3) to (7)) is also applicable to the first and second arrays of microlenses according to the second embodiment. The difference only lies in that in the second embodiment, the first microlenses are negative lenses, and form a virtual image for the object plane OP (the display surface of the display 1) (see the description made below in conjunction with FIG. 17). Therefore, the object distance $u_1$ is positive while the image distance $v_1$ is negative, and $M_1$ is negative accordingly. Therefore, according to the aforesaid relation expressions (3) to (7), in this embodiment, the arrangement distance $d_2$/period $P_2$ of the second microlenses is smaller than the arrangement distance $d_1$/period $P_1$ of the first microlenses in the same direction, as shown in FIGS. 15A and 15B.

In the second embodiment, if the first and second arrays of microlenses under aperiodic arrangement satisfy the aforesaid relation expression (3), or the first and second arrays of microlenses under periodic arrangement satisfy the aforesaid relation expression (6) or (7), then corresponding to one and the same point on the object plane OP (the display surface of the display 1), the parallel light beams projected from different optical channels are parallel to each other.

Figure 17:
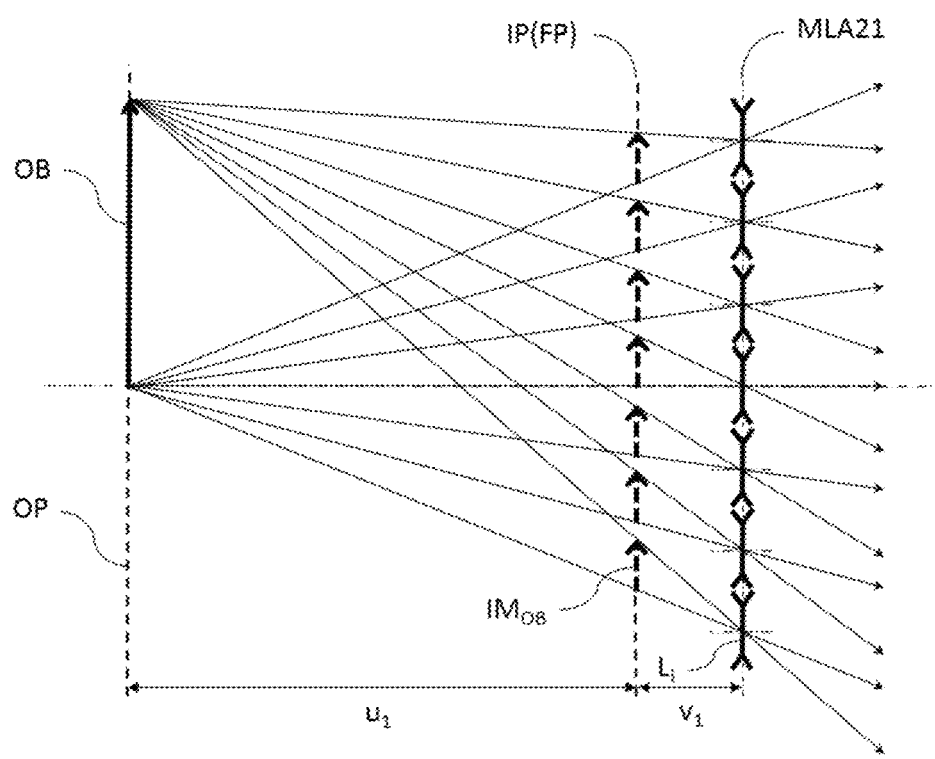
FIG. 17 is a schematic diagram of imaging of the first array of microlenses in the second embodiment.
Figure 18A:
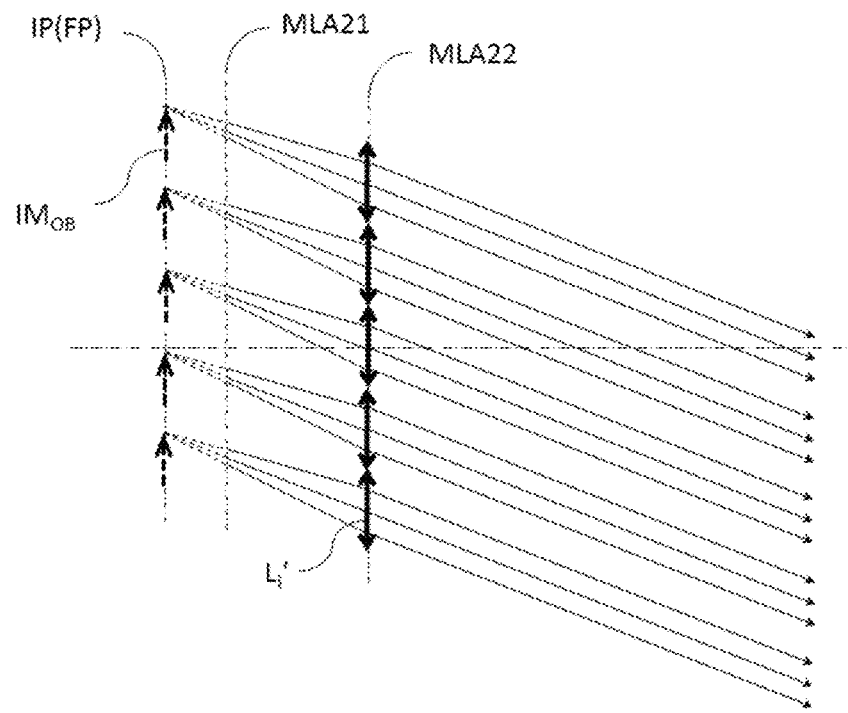
FIGS. 18A and 18B schematically show the situation where multiple images formed by the first microlenses are projected through a corresponding second microlens respectively in the second embodiment.
Figure 18B:
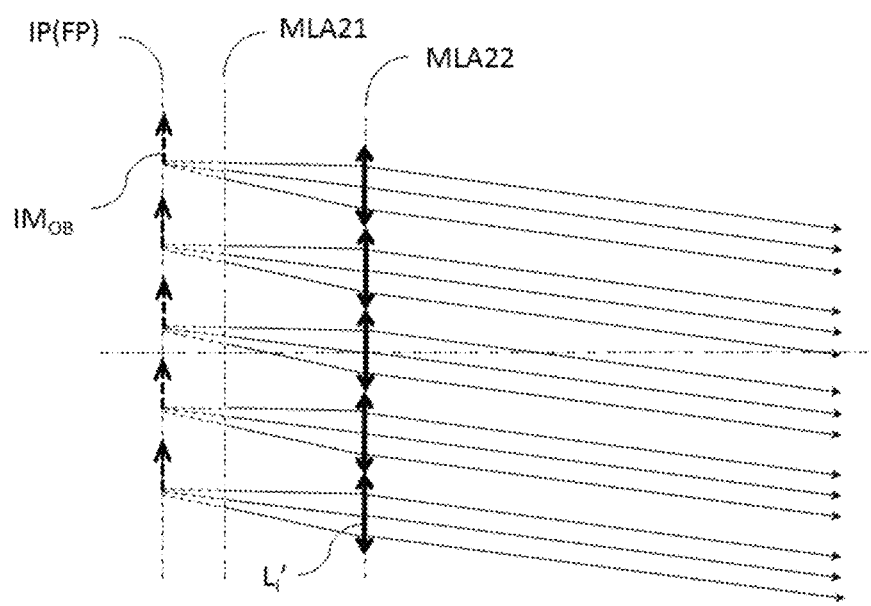

FIGS. 17 to 19 schematically show imaging of different points on the object plane (the display surface of the display 1) by the near-eye display device 20/the near-eye optical imaging system according to the second embodiment. In FIG. 17 and FIGS. 18A and 18B, in order to more clearly illustrate the relative position relation of the points on the object plane (the display surface of the display 1), the display 1 is replaced with an object with a direction (an arrow) OB located on the object plane OP.

FIG. 17 is a schematic diagram of imaging of the first array of microlenses MLA21 in the second embodiment. It can be seen that a plurality of first microlenses $L_i$ image the object OB located on the object plane OP, respectively to obtain upright and shrinked virtual images $IM_{OB}$ on the image plane IP in the same number as that of the first microlenses. The images formed by the plurality of first microlenses may not overlap with each other, or may overlap with each other as well. The present invention is not limited in this respect.

Since the image planes IP of the first array of microlenses MLA21 coincide with the object side planes FP of the second array of microlenses MLA22, multiple images $IM_{OB}$ of the object OB formed by the plurality of first microlenses of the first array of microlenses MLA21 form an object located on the object side focal plane FP for the second microlenses.

According to the imaging rules of a positive lens, light emitted from any point on the object side focal plane is incident to the positive lens, from which a parallel light beam exits, and the angle of the parallel light beam emergent from the positive lens varies along with the position of the point. FIGS. 18A and 18B schematically show the situation where multiple images $IM_{OB}$ are projected through a corresponding second microlens $L_i'$ respectively in the second embodiment. FIG. 18A shows the parallel light beams projected from the respectively corresponding second microlenses $L_i'$ in correspondence to the top vertex of the object OB (the top of the arrow); and FIG. 18B shows the parallel light beams projected from the respectively corresponding second microlenses $L_i'$ in correspondence to the bottom vertex of the object OB (the bottom of the arrow). By comparing FIG. 18A with FIG. 18B, it can be found that the parallel light beams projected from the corresponding second microlenses in correspondence to the top vertex of the object OB (the top of the arrow) have a larger angle of elevation, such that the top vertex of the object OB will be imaged to a point at a relatively high position on the plane at infinity; and the parallel light beams projected from the corresponding second microlenses in correspondence to the bottom vertex of the object OB (the bottom of the arrow) have a smaller angle of elevation, such that the bottom vertex of the object OB will be imaged to a point at a relatively low position on the plane at infinity. This means that points at different positions on the object plane OP can be imaged in a correct position relation by means of the near-eye optical imaging system according to the embodiment.

Figure 19A:
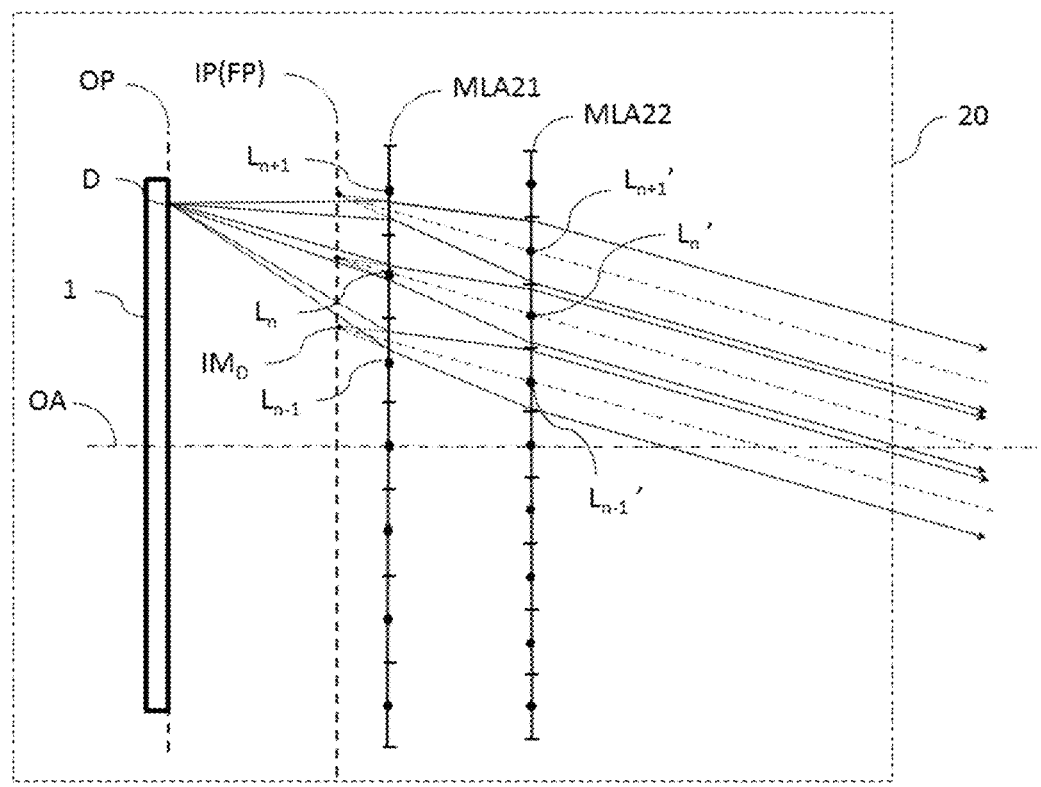
FIGS. 19A and 19B are schematic diagrams of imaging of two points at different positions on the display through multiple optical channels respectively in the second embodiment.
Figure 19B:
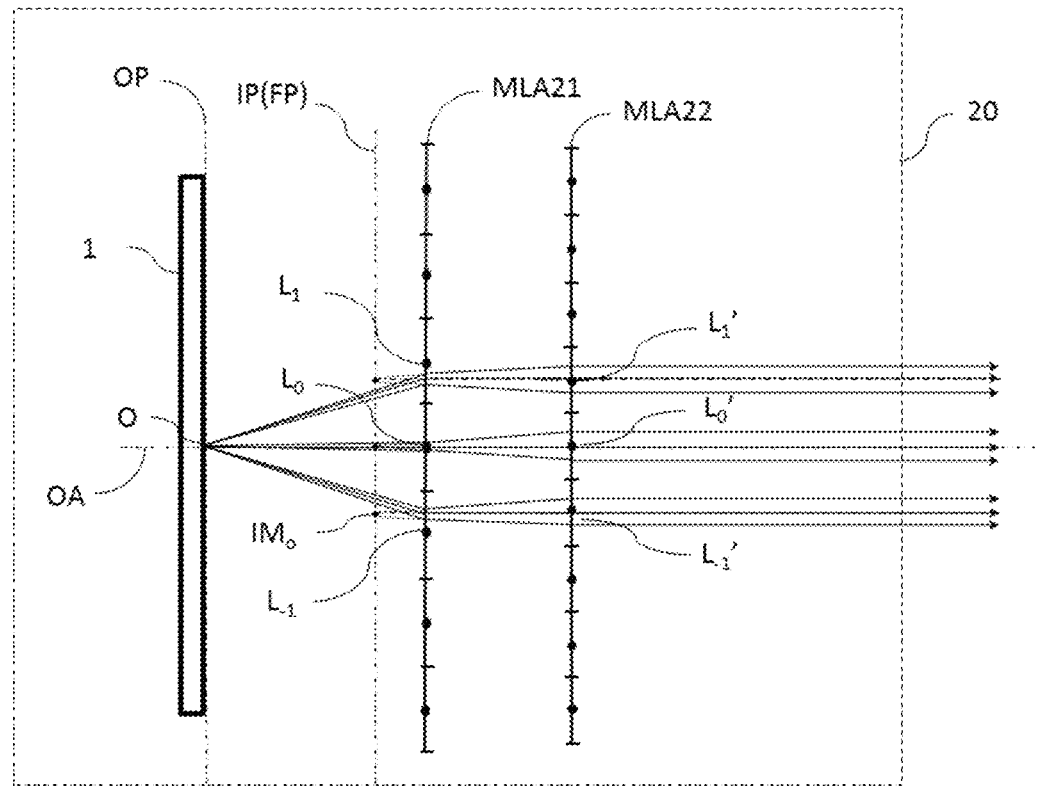

FIGS. 19A and 19B each show the imaging of two points at different positions on the display surface of the display 1 through multiple optical channels by means of the near-eye display device 20 according to the second embodiment of the present invention. FIG. 19A shows that any point D on the display surface deviating from the optical axis OA projects multiple parallel light beams parallel to each other through the optical channels formed by both the plurality of first microlenses $L_{n-1}$, $L_n$, $L_{n+1}$ in the first array of microlenses MLA21 and the corresponding plurality of second microlenses $L_{n-1}'$, $L_n'$, $L_{n+1}'$ in the second array of microlenses MLA22. FIG. 19B shows that point O on the display surface located on the optical axis OA projects multiple parallel light beams parallel to each other through the optical channels formed by both the plurality of first microlenses $L_{-1}$, $L_0$, $L_1$ in the first array of microlenses MLA21 and the corresponding plurality of second microlenses $L_{-1}'$, $L_0'$, $L_1'$ in the second array of microlenses MLA22. The number and position of the optical channels for projecting light from the same point as shown in FIGS. 19A and 19B are not restrictive, but exemplary.

With reference to FIGS. 17 to 19, it can be seen that the near-eye display device 20/the near-eye optical imaging system according to the second embodiment of the present invention can image the display surface (the object plane) of the display located within a near-eye range onto a plane at infinity in a correct position relation.

Figure 20A:
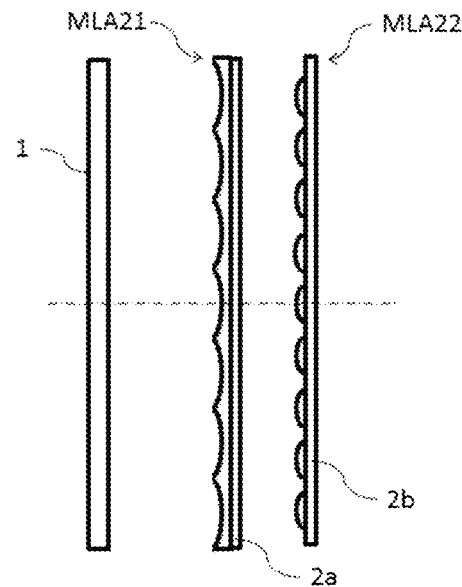
FIGS. 20A and 20B show exemplary structures of the first array of microlenses and the second array of microlenses that can be used for the second embodiment.
Figure 20B:
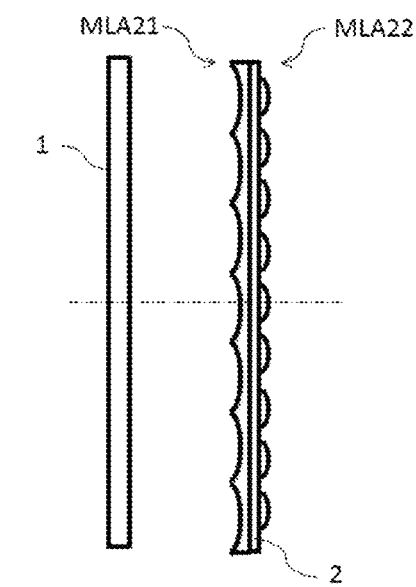

Similar to the case in the first embodiment, various configurations also can be adopted for the first array of microlenses MLA21 and the second array of microlenses MLA22 in the second embodiment. FIGS. 20A and 20B show exemplary configurations in which the first array of microlenses MLA21 and the second array of microlenses MLA22 are formed on two separate substrates 2a and 2b and formed on the same substrate 2, respectively. This is similar to the case discussed with reference to FIGS. 13A and 13B, and no more description will be provided here.

Extended Embodiments

A near-eye display device according to the first and second embodiments of the present invention has been described above in conjunction with FIGS. 7 to 20, wherein the near-eye display device comprises a display and a near-eye optical imaging system according to the present invention, and the near-eye optical imaging system comprises a first and a second arrays of microlenses. In addition to the display, the first array of microlenses and the second array of microlenses, the near-eye display device according to the present invention also can selectively comprise other components or structures, such as apertures and field lenses, to provide further advantageous technical effects. Multiple extended embodiments of the near-eye optical imaging system and the near-eye display device according to the present invention with other components combined or modifications in structure are described below in conjunction with the accompanying drawings.

FIGS. 21A to 21G show extended examples of the near-eye optical imaging system and the near-eye display device according to the present invention, in which an array of apertures and/or a field lens is combined in different ways.

The array of apertures comprises an opaque substrate and multiple light-transmitting holes formed on the opaque substrate. The multiple light-transmitting holes can be arranged in correspondence to the multiple microlenses in the array of microlenses. The diameter of the light-transmitting holes can be equal to, greater than or smaller than that of respective microlenses according to the position and distance relative to the multiple microlenses. The array of apertures can, by blocking large-angle light, eliminate the aberration caused by the large-angle light and enhance the imaging quality of the imaging optical components. In addition, the array of apertures can, by blocking stray light, improve the contrast of imaging.

Figure 21A:
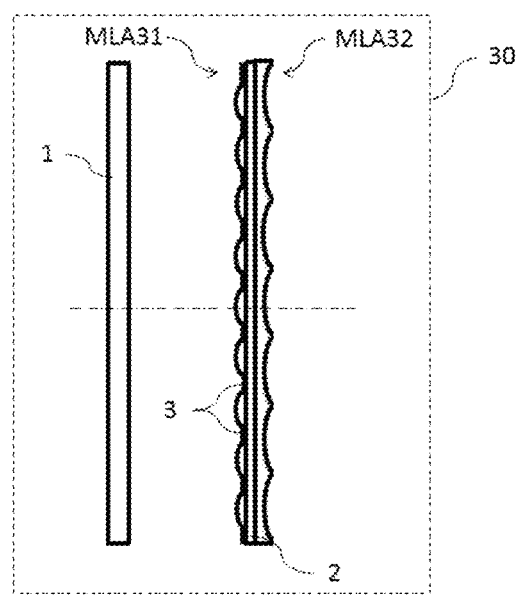
FIGS. 21A to 21G show multiple extended examples of a near-eye optical imaging system and a near-eye display device according to the present invention, in which an array of apertures and/or a field lens is combined in different ways.
Figure 21B:
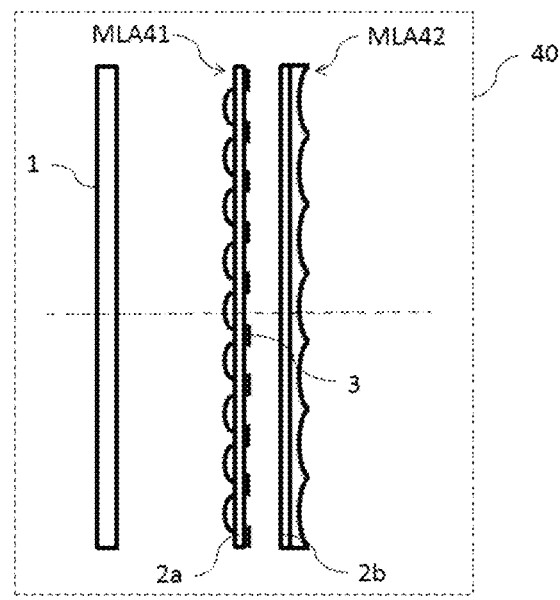

In the extended examples shown in FIGS. 21A and 21B, the array of apertures 3 is disposed to adjoin a first array of microlenses MLA31 and MLA41. As shown in FIG. 21A, the array of apertures 3 can be attached to the surface of the first array of microlenses MLA31, and for example can be formed with a plurality of first microlenses on the same side of the same substrate 2. Alternatively, as shown in FIG. 21B, the array of apertures 3 may be arranged on the reverse side of the first array of microlenses MLA41, and specifically formed with a plurality of first microlenses on two opposite sides of the same substrate 2a.

Figure 21C:
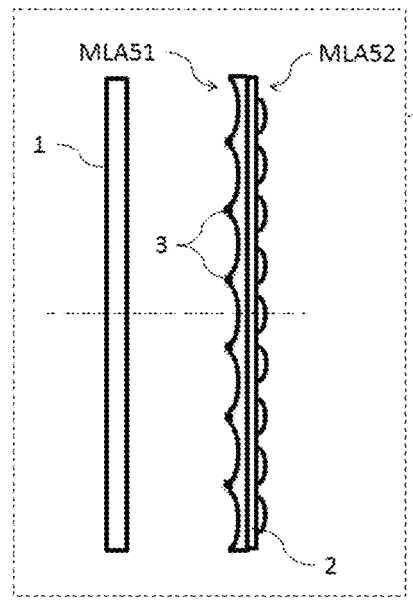
Figure 21D:
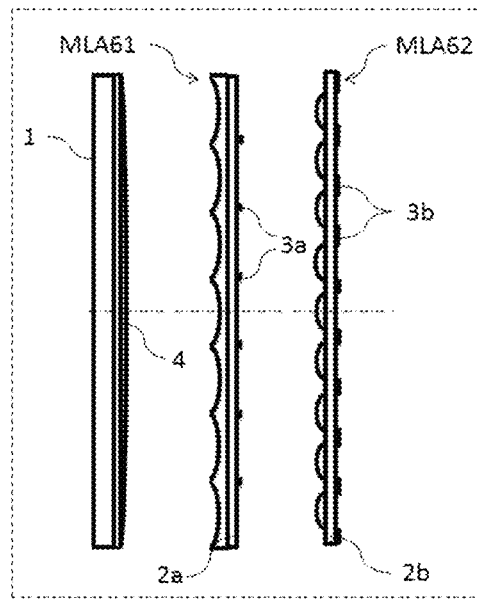

Unlike the first array of microlenses MLA31 and MLA41 in FIGS. 21A and 21B, which are positive lens arrays, the first array of microlenses MLA51 and MLA61 are arrays of negative lenses in the extended examples shown in FIGS. 21C and 21D. As shown in the figure, the arrays of negative lenses MLA51 and MLA61 can also be combined with the arrays of apertures 3 and 3a. Similarly, the array of apertures can be attached to the surface of the array of negative lenses (see FIG. 21C) or arranged on the reverse side of the array of negative lenses (see FIG. 21D).

In addition, by referring to FIG. 21D, the array of apertures can also be disposed to adjoin a second array of microlenses MLA62. The specific way of arrangement can be the same as or similar to that of making it adjoin the first array of microlenses, and no more description will be provided here. Moreover, as shown in FIG. 21D, the first array of microlenses MLA61 and the second array of microlenses MLA62 can be combined with arrays of apertures 3a and 3b, respectively.

It should be understood that the array of apertures can also be arranged on a substrate separate from the first array of microlenses and the second array of microlenses, though not shown in the figure. Moreover, the array of apertures can also be embedded into the interior of the substrate (e.g. embedded between two substrates glued to each other), rather than arranged on the surface of the substrate, and the surface of the substrate then can further be used to carry other components, such as arrays of microlenses and/or field lenses.

Figure 21E:
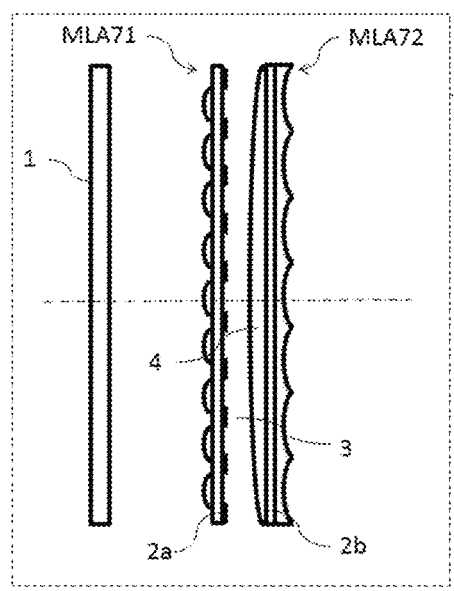
Figure 21F:
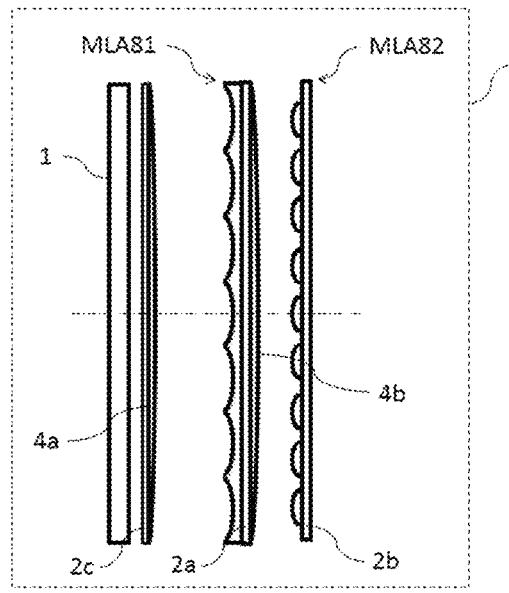

The near-eye display device according to the present invention can also be combined with a field lens. As shown in FIG. 21D, a field lens 4 is arranged between the display 1 and the first microlens MLA61, and has a main plane substantially coincident with the display surface. The field lens 4 is preferably disposed to adjoin the display surface of the display 1 (not shown). The field lens can also be arranged between the first array of microlenses and the second array of microlenses, as shown in FIG. 21E. Alternatively, more than one field lens can be arranged. For example, as shown in FIG. 21F, a field lens 4a between the display 1 and the first array of microlenses MLA81 and a field lens 4b between the first array of microlenses MLA81 and second array of microlenses MLA82 are arranged simultaneously. In general, a field lens disposed between the display and the first array of microlenses has a main plane which coincides with the display surface of the display, while the one disposed between the first array of microlenses and the second array of microlenses has a main plane which coincides with the image plane IP of the first array of microlenses.

The field lens can be formed on a separate substrate (such as the field lens 4a in FIG. 21F), or formed with other components on both sides of the same substrate (such as the field lens 4b in FIG. 21F).

Figure 21G:
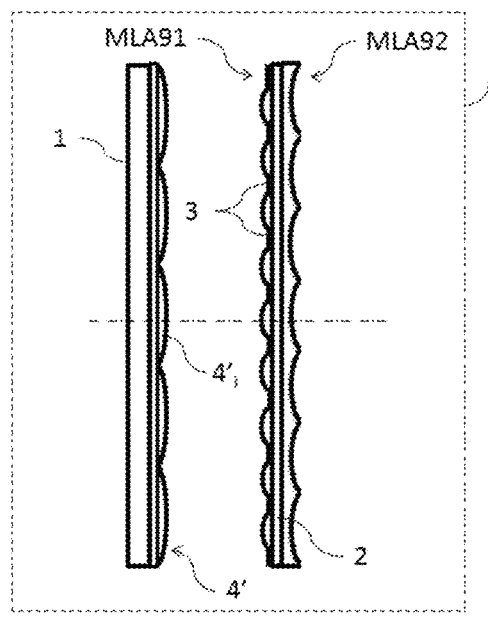
Figure 22:
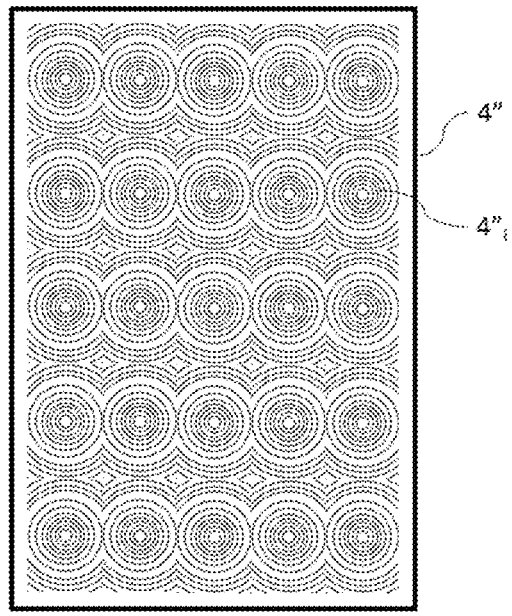
FIG. 22 shows an example of an array of field lenses formed by Fresnel lenses.

In FIGS. 21D to 21F, the field lenses are shown to be formed by single positive lenses. However, the present invention is not limited to this. For example, as shown in FIG. 21G, the field lens 4' may also be formed by an array of positive lenses including several positive lenses $4'_i$. In addition, the field lens can be formed by a positive lens of other types than a convex lens, such as one of a spherical lens, an aspheric lens, a graded index lens, a Fresnel lens, and a multi-level near-curved lens. FIG. 22 shows an example of an array of field lenses formed by Fresnel lenses. Surely, a single positive lens formed by a single Fresnel lens can also be used as a field lens.

In addition, although not shown in the figure, a substrate for carrying an array of microlenses, an array of apertures, and/or a field lens can have varied thickness in a direction parallel to the optical axis, thereby introducing a certain amount of additional refractive power. In some cases, the substrate itself can act as a field lens. Accordingly, or alternatively, at least one surface of the substrate perpendicular to the optical axis may not be a plane, but, for example, a curved or stepped surface. For example, although the thickness of the substrate in the direction parallel to the optical axis is uniform, both surfaces perpendicular to the optical axis can be formed into the shape of a curved surface.

Figure 23:
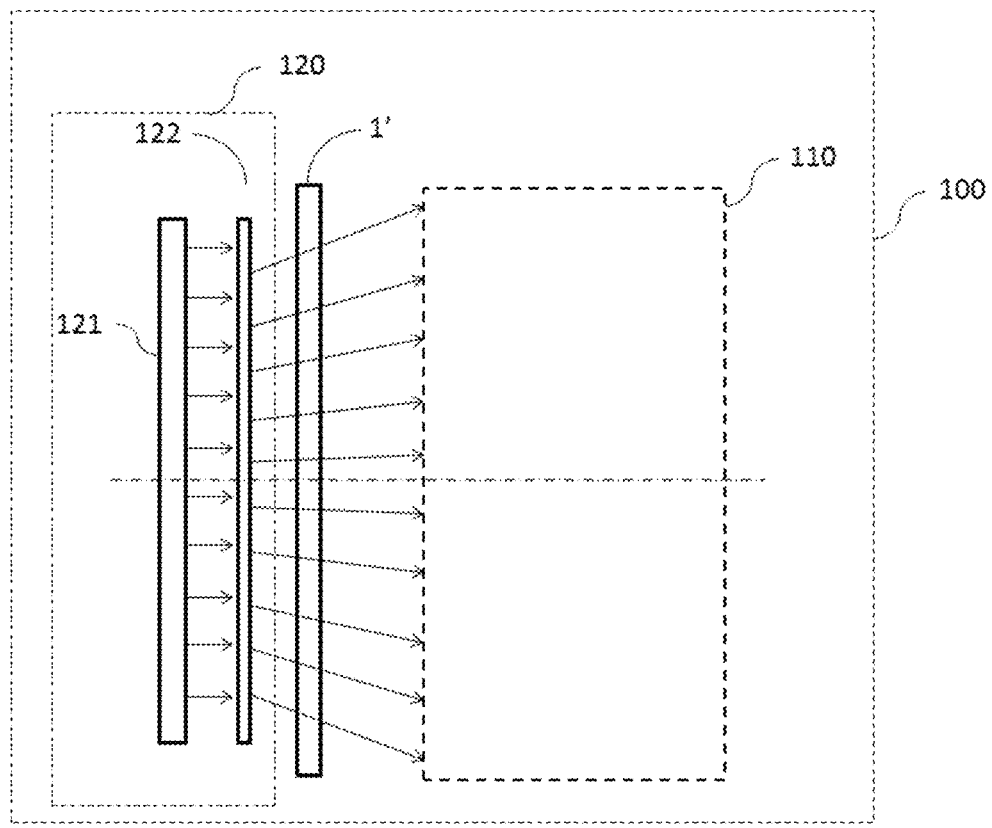
FIG. 23 shows an extended example of a near-eye display device according to the present invention, in which a wave front modulated light source is disposed.

An extended example of a near-eye display device according to the present invention will be described below with reference to FIG. 23, in which a wave front modulated light source is disposed. As shown in the figure, a near-eye display device 100 comprises a spatial light modulator 1' and a near-eye optical imaging system 110. The spatial light modulator 1' can absorb or attenuate light, but does not change the direction of light. The spatial light modulator 1' modulates light incident thereon to display an image, thereby acting as a display. The near-eye optical imaging system 110 is a near-eye optical imaging system according to the present invention, comprising a first and a second arrays of microlenses, and no more description of the specific structure thereof will be provided here. In this extended example, the near-eye display device 100 further comprises a wave front modulated light source 120 for providing diverging or converging light to illuminate the spatial light modulator 1'. The wave front modulated light source 120 can be configured in different structures, and FIG. 23 only provides an example. As shown in FIG. 23, the wave front modulated light source 120 comprises a backlight module 121 and a Fresnel lens 122, wherein the backlight module 121 is used to provide a surface light source, and the Fresnel lens 122 is a positive lens or a negative lens, which enables light from the backlight module 121 to converge or diverge and projects light toward the spatial light modulator 1'. Since the spatial light modulator 1' does not change the direction of the light modulated by the same, the light emitted from the spatial light modulator 1' into the near-eye optical imaging system 110 can still keep divergent or convergent, which is advantageous to improve the imaging quality of the near-eye optical imaging system 110.

Head-Mounted Display Device

Figure 24:
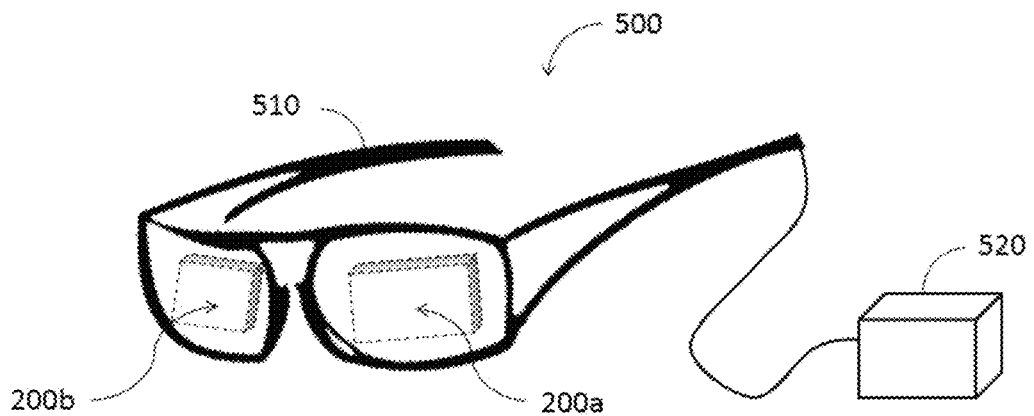
FIG. 24 is a schematic diagram of a head-mounted display device based on the near-eye optical imaging system/near-eye display device according to the present invention.

A head-mounted display device can be configured based on the near-eye optical imaging system/near-eye display device according to the present invention. FIG. 24 schematically shows a head-mounted display device 500 based on a near-eye optical imaging system/near-eye display device according to the present invention. The head-mounted display device 500 comprises a head-mounted device 510, which, for example, can be configured into a spectacle frame structure as shown in the figure. Near-eye display devices 200a and 200b can be arranged at a position within a near-eye range of the head-mounted device 510 corresponding to both eyes of a wearer (equivalent to the position of spectacle lenses in spectacles), which are used to directly project into the eyes the images displayed on the displays in the near-eye display devices 200a and 200b, respectively, such that the user can watch images presented on the displays arranged within the near-eye range.

Figure 25:
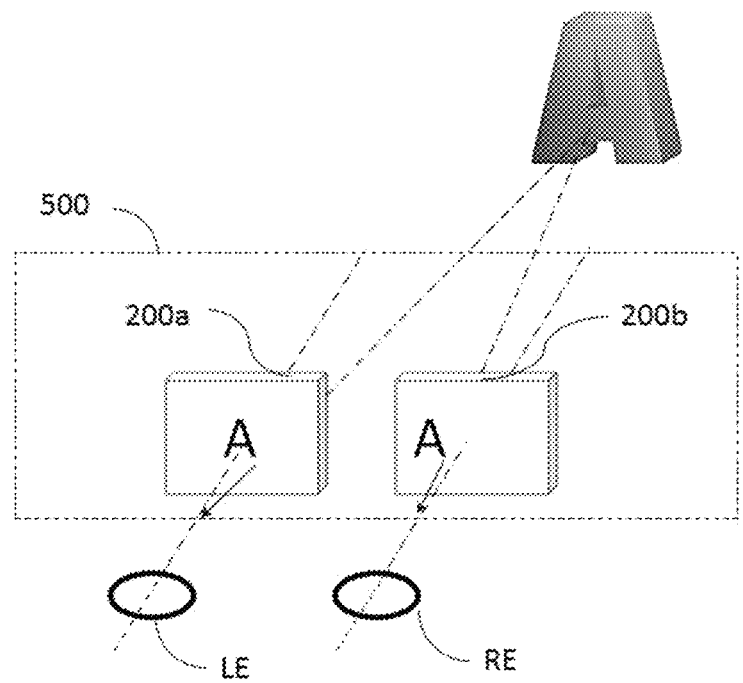
FIG. 25 is a schematic diagram of the head-mounted display device shown in FIG. 24 for use as a 3D display device.

The head-mounted display device 500 based on the near-eye optical imaging system/near-eye display device according to the present invention can be used for 2D display or also for 3D display. FIG. 25 is a schematic diagram of the head-mounted display device 500 used as a 3D display device. The head-mounted display device 500, when for 3D display, is based on the principle of binocular vision. As shown in FIG. 25, the near-eye display device 200a for the left eye LE and the near-eye display device 200b for the right eye RE display two images of the same picture content but being offset from each other (or referred to as a left eye image and a right eye image, respectively), such that the human eyes can watch/feel a stereoscopic image due to the binocular parallax during the observation.

In addition, as shown in FIG. 24, the head-mounted display device 500 can further comprise a control unit 520. The control unit 520 can be integrated with a power supply, a circuit, a computing equipment and the like for driving the near-eye display device and other equipment on the head-mounted device 510. The control unit 520 can be integrated/installed on the head-mounted device 510, or also can be separate from the head-mounted device 510 (as shown in FIG. 24), for example, being configured into a handheld device or integrated in a handheld device. In addition, the control unit 520 can also be configured to be partially integrated in the head-mounted device 510 and partially separated from the head-mounted device 510, for example, being integrated in a handheld device. The control unit 520 can be in connection and communication with the near-eye display device and other equipment in wired and/or wireless ways. The control unit 520 can control the near-eye display device 200a for the left eye LE and the near-eye display device 200b for the right eye RE to display the same image or different images, so as to realize the switching between 2D display and 3D display.

The head-mounted display device 500 can be used for Virtual Reality display, namely, providing immersive 3D display while shielding light from the external environment. In this case, light from outside can be shielded by the display included in the near-eye display device or by providing an additional component.

The head-mounted display device 500 can also be used for Augmented Reality display or Mixed Reality display. For example, the display and the arrays of microlenses included in the near-eye display device can be configured to be electro-optical controllable, such that the display and the arrays of microlenses can be switched between transparent and opaque states to allow 3D display or viewing of the surrounding environment.

A near-eye optical imaging system/near-eye display device according to the present invention is configured based on two arrays of microlenses, while the arrays of microlenses can be made light in weight and thin in shape, such that the near-eye optical imaging system/near-eye display device according to the present invention and the head-mounted display device 500 configured based on the near-eye optical imaging system/near-eye display device can also be featured by lightness and thinness. In addition, the costs of manufacturing an array of microlenses are relatively low, which is also in favor of controlling the costs of the head-mounted display device 500.

According to an aspect of the present application, a near-eye optical imaging system is provided, comprising: a first array of microlenses comprising a plurality of first microlenses; and a second array of microlenses comprising a plurality of second microlenses, arranged side-by-side with the first array of microlenses; wherein the plurality of first microlenses each in the first array of microlenses correspond to one of the second microlenses in the second array of microlenses respectively to form multiple optical channels, wherein in each optical channel, the first microlens forms on an object side focal plane of the second microlens an image of an object located on a predetermined object plane, to project a parallel light beam; wherein corresponding to one and the same point on the object plane, multiple parallel light beams projected through the multiple optical channels are parallel to each other; and corresponding to any two points at different positions on the object plane, parallel light beams in different directions are projected through the optical channels, and the relative relation of the different directions corresponds to the relative position relation of the two points on the object plane.

According to an aspect of the present application, in the multiple optical channels, lines connecting images of any point of the object formed by the first microlenses to optical centers of the corresponding second microlenses are parallel to each other.

According to an aspect of the present application, the refractive power of the plurality of first microlenses has the same positive and negative characteristics, and the refractive power of the plurality of second microlenses has the same positive and negative characteristics, the plurality of first microlenses of the first array of microlenses form images of the object on image planes coplanar with each other, the plurality of second microlenses of the second array of microlenses have coplanar object side focal planes, and the object side focal planes coincide with the image planes of the first array of microlenses.

According to an aspect of the present application, the plurality of first microlenses have the same refractive power as each other, the distance between two second microlenses in any two optical channels is equal to the distance between two images of the object formed respectively by two first microlenses in the two optical channels.

According to an aspect of the present application, a distance d1 between two first microlenses and a distance d2 between two second microlenses in any two optical channels satisfy the following relation: $d_2=d_1(1+M_1)$, $M_1$ represents a magnification of the object by the first microlenses, i.e.

$$M_1 = \frac{v_1}{u_1};$$

$u_1$ is an object distance from the object plane to the first array of microlenses, and $v_1$ is an image distance from the image plane to the first array of microlenses, $u_1$ being positive when the object is a real object relative to the first microlenses, $u_1$ being negative when the object is a virtual object relative to the first microlenses, $v_1$ being positive when the first microlenses form a real image, and $v_1$ being negative when the first microlenses form a virtual image.

According to an aspect of the present application, the plurality of first microlenses of the first array of microlenses are arranged periodically, the plurality of second microlenses of the second array of microlenses are also arranged periodically, and both satisfy the following relation so that the angular magnification of the virtual image formed by the near-eye optical imaging system is 1: $P_2=P_1 (1+M_1)$, wherein $P_1$ is an arrangement period of the plurality of first microlenses of the first array of microlenses in a direction, $P_2$ is an arrangement period of the plurality of second microlenses of the second array of microlenses in the direction, and $M_1$ represents a magnification of the object by the first microlenses, i.e.

$$M_1 = \frac{v_1}{u_1}.$$

According to an aspect of the present application, the equivalent focal length of the near-eye optical imaging system F is calculated by $$F = f_2 + \frac{P_2}{P_1} u_1,$$

$f_2$ is the focal length of the second microlens, wherein P1 is an arrangement period of the plurality of first microlenses of the first array of microlenses in a direction, P2 is an arrangement period of the plurality of second microlenses of the second array of microlenses in the direction, u1 is an object distance from the object plane to the first array of microlenses.

According to an aspect of the present application, the plurality of second microlenses are positive lenses, and the plurality of first microlenses form an upright image of the object, the plurality of first microlenses are negative lenses, and the plurality of first microlenses form a shrinked virtual image of the object between the object and the first array of microlenses, the first array of microlenses and the second array of microlenses satisfy P1>P2, wherein P1 is an arrangement period of the plurality of first microlenses of the first array of microlenses in a direction, P2 is an arrangement period of the plurality of second microlenses of the second array of microlenses in the direction.

According to an aspect of the present application, the plurality of second microlenses are negative lenses, and the plurality of first microlenses form an inverted image of the object, the plurality of first microlenses are positive lenses, and the plurality of first microlenses form a shrinked real image on a side of the second array of microlenses opposite to the first array of microlenses, the first array of microlenses and the second array of microlenses satisfy P1<P2, wherein P1 is an arrangement period of the plurality of first microlenses of the first array of microlenses in a direction, P2 is an arrangement period of the plurality of second microlenses of the second array of microlenses in the direction.

According to an aspect of the present application, the plurality of first microlenses include at least two different types of lenses, and/or the plurality of second microlenses include at least two different types of lenses, the plurality of first microlenses and the plurality of second microlenses include at least one of spherical lens, aspheric lens, graded index lens, Fresnel lens or multi-level near-curved lens.

According to an aspect of the present application, at least one of the first microlenses and/or the second microlenses has intervals between adjacent lens units.

According to an aspect of the present application, at least a part of the first microlenses and/or the second microlenses is a combined lens comprising two or more microlenses in cascade, the first array of microlenses comprises two or more layers of microlens array superimposed together, and the two or more microlenses in cascade include microlenses from the two or more layers of microlens array respectively; and/or the second array of microlenses comprises two or more layers of microlens array superimposed together, and the two or more microlenses in cascade include microlenses from the two or more layers of microlens array respectively.

According to an aspect of the present application, the first array of microlenses and the second array of microlenses are formed on the surfaces of two separate substrates, facing each other, and an air gap exists in between the first array of microlenses and the second array of microlenses.

According to an aspect of the present application, the near-eye optical imaging system further comprises a substrate for carrying at least one of the first array of microlenses and/or the second array of microlenses, wherein the thickness of the substrate is varied in the direction parallel to an optical axis of the array of microlenses, at least one surface of two surfaces opposite to each other of the substrate in a direction parallel to the optical axis of the array of microlenses carried thereon is a curved or stepped surface.

According to an aspect of the present application, the predetermined object plane is located on the side of the first array of microlenses opposite to the second array of microlenses, the predetermined object plane is not located on the focal plane of the first array of microlenses, the distance between the predetermined object plane and the optical center of the first array of microlenses along the optical axis of the first array of microlenses is greater than the focal length of the first microlens.

According to an aspect of the present application, the near-eye optical imaging system, furthering comprises a display arranged on the predetermined object plane and having a display surface for displaying images, wherein the distance between the predetermined object plane and the optical center of the first array of microlenses along the optical axis of the first array of microlenses is two to thirty times the focal length of the first microlens.

According to an aspect of the present application, the near-eye optical imaging system further comprises an array of apertures disposed to adjoin the first array of microlenses and/or the second array of microlenses, the array of apertures is attached to a surface of the first array of microlenses and/or the second array of microlenses, wherein the array of apertures comprises an opaque substrate and multiple light-transmitting holes formed on the opaque substrate, and the multiple light-transmitting holes are arranged corresponding to the plurality of first microlenses in the first array of microlenses.

According to an aspect of the present application, the near-eye optical imaging system further comprises a field lens placed inbetween the display and the first array of microlenses, having its main plane substantially coincident with the display surface of the display.

According to an aspect of the present application, the near-eye optical imaging system further comprises a field lens placed inbetween the first array of microlenses and the second array of microlenses, the field lens is formed on the opposite sides of the same substrate with reference to the first array of microlenses or the second array of microlenses.

According to an aspect of the present application, the thickness of the substrate in a direction parallel to the optical axis is varied, at least one surface of two surfaces opposite to each other of the substrate in a direction parallel to the optical axis of the second array of microlenses is a curved or stepped surface.

According to an aspect of the present application, the field lens is constituted by one of graded index lens, Fresnel lens, multi-level near-curved lens, spherical lens or aspheric lens.

According to an aspect of the present application, the near-eye optical imaging system further comprises a wave front modulated light source, emitting diverging or converging light to illuminate the display to achieve display on the display.

According to an aspect of the present application, a near-eye display device is provided, comprising: a display, having a display surface for displaying images; a first array of microlenses, arranged on a side of the display surface of the display, and comprising a plurality of first microlenses; and a second array of microlenses, arranged on a side of the first array of microlenses opposite to the display, and comprising a plurality of second microlenses; wherein the plurality of first microlenses each in the first array of microlenses correspond to one of the second microlenses in the second array of microlenses respectively to form multiple optical channels, wherein in each optical channel, the first microlens each forms an image of the display surface on the object side focal plane of the second microlens, to project a parallel light beam; wherein corresponding to one and the same point on the display surface, multiple parallel light beams projected through the multiple optical channels are parallel to each other; and wherein corresponding to any two points at different positions on the display surface, parallel light beams in different directions are projected through the optical channels, and the relative relation of the different directions corresponds to the relative position relation of the two points on the display surface.

According to an aspect of the present application, a near-eye optical imaging system is provided, comprising: a first array of microlenses comprising a plurality of first microlenses arranged periodically and having the same refractive power; and a second array of microlenses arranged side by side with the first array of microlenses, comprising a plurality of second microlenses arranged periodically and having the same refractive power, wherein one of the first array of microlenses and the second array of microlenses is a positive lens array, and the other is a negative lens array; the plurality of first microlenses of the first array of microlenses form images of an object located on a predetermined object plane on the image planes that are coplanar with each other, the plurality of second microlenses of the second array of microlenses have object side focal planes coplanar with each other, and the object side focal planes coincide with the image planes; and the first array of microlenses and the second array of microlenses are configured to meet the following relation so that the angular magnification of the virtual image formed by the near-eye optical imaging system is 1: P2=P1 (1+M1), wherein P1 is an arrangement period of the plurality of first microlenses of the first array of microlenses in a direction, P2 is an arrangement period of the plurality of second microlenses of the second array of microlenses in the direction, and M1 represents a magnification of the object by the first microlenses, i.e.

$$M_1 = \frac{v_1}{u_1},$$

u1 is an object distance from the object plane to the first array of microlenses, and v1 is an image distance from the image plane to the first array of microlenses, u1 being positive when the object is a real object relative to the first microlens, u1 being negative when the object is a virtual object relative to the first microlens, v1 being positive when the first microlens forms a real image, and v1 being negative when the first microlens forms a virtual image.

According to an aspect of the present application, the equivalent focal length of the near-eye optical imaging system F is calculated by $$F = f_2 + \frac{P_2}{P_1} u_1,$$

$f_2$ is the focal length of the second microlens, wherein P1 is an arrangement period of the plurality of first microlenses of the first array of microlenses in a direction, P2 is an arrangement period of the plurality of second microlenses of the second array of microlenses in the direction, u1 is an object distance from the object plane to the first array of microlenses.

According to an aspect of the present application, the plurality of second microlenses are positive lenses, and the plurality of first microlenses form an upright image of the object, the plurality of first microlenses are negative lenses, and the plurality of first microlenses form a shrinked virtual image of the object between the object and the first array of microlenses, the first array of microlenses and the second array of microlenses satisfy P1>P2.

According to an aspect of the present application, the plurality of second microlenses are negative lenses, and the plurality of first microlenses form an inverted image of the object, the plurality of first microlenses are positive lenses, and the plurality of first microlenses form a shrinked real image on a side of the second array of microlenses opposite to the first array of microlenses, the first array of microlenses and the second array of microlenses satisfy P1<P2.

According to an aspect of the present application, the plurality of first microlenses include at least two different types of lenses, and/or the plurality of second microlenses include at least two different types of lenses.

According to an aspect of the present application, the near-eye optical imaging system further comprises a display arranged on the predetermined object plane and having a display surface for displaying images, wherein the predetermined object plane is not located on the focal plane of the first array of microlenses, the distance between the predetermined object plane and the optical center of the first array of microlenses along the optical axis of the first array of microlenses is two to thirty times the focal length of the first microlens.

According to an aspect of the present application, a head-mounted display device is provided, comprising a head-mounted device comprising a near-eye display device, the near-eye display device being arranged to be located within a near-eye range of both eyes of a wearer of the head-mounted display device, the near-eye display device comprising: a display, having a display surface for displaying images; a first array of microlenses, arranged on a side of the display surface of the display, and comprising a plurality of first microlenses; and a second array of microlenses, arranged on a side of the first array of microlenses opposite to the display, and comprising a plurality of second microlenses; wherein the plurality of first microlenses each in the first array of microlenses correspond to one of the second microlenses in the second array of microlenses respectively to form multiple optical channels, wherein in each optical channel, the first microlens each forms an image of the display surface on the object side focal plane of the second microlens, to project a parallel light beam; wherein corresponding to one and the same point on the display surface, multiple parallel light beams projected through the multiple optical channels are parallel to each other; and wherein corresponding to any two points at different positions on the display surface, parallel light beams in different directions are projected through the optical channels, and the relative relation of the different directions corresponds to the relative position relation of the two points on the display surface.

According to an aspect of the present application, the head-mounted display device further comprises a control unit in connection and communication with the near-eye display device, operable to control the near-eye display device to switch between a 2D display mode and a 3D display mode, wherein the display of the near-eye display device, in the 2D display mode, shows the same image to the left and right eyes of the wearer, and the display of the near-eye display device, in the 3D display mode, shows different images to the left and right eyes of the wearer.

The aforesaid description only involves some preferred embodiments of the present application and an explanation of the technical principles adopted herein. It should be understood by those skilled in the art that the scope of invention referred to in the present application is not limited to technical solutions reached by certain combinations of the aforesaid technical features, but also covers other technical solutions concluded by any combination of the aforesaid technical features or their equivalent features, without departure from the described inventive conception, for example the technical solutions formed from the mutual replacement of the aforesaid features with (but not limited to) the technical features having similar functions disclosed in the present application.

We claim:

1. A near-eye optical imaging system, comprising:
    a first array of microlenses comprising a plurality of first microlenses; and
    a second array of microlenses comprising a plurality of second microlenses, and arranged side-by-side with the first array of microlenses;
    wherein the plurality of first microlenses each in the first array of microlenses correspond to one of the second microlenses in the second array of microlenses respectively to form multiple optical channels, wherein in each optical channel, the first microlens forms on an object side focal plane of the second microlens an image of an object located on a predetermined object plane, to project a parallel light beam;
    wherein corresponding to one and the same point on the object plane, multiple parallel light beams projected through the multiple optical channels are parallel to each other;
    wherein corresponding to any two points at different positions on the object plane, parallel light beams in different directions are projected through the optical channels, and the relative relation of the different directions corresponds to the relative position relation of the two points on the object plane; and
    wherein the predetermined object plane is placed at a distance to the first array of microlenses that is larger than the focal length of the first array of microlenses.

2. The near-eye optical imaging system according to claim 1, wherein in the multiple optical channels, lines connecting images of any point of the object formed by the first microlenses to optical centers of the corresponding second microlenses are parallel to each other.

3. The near-eye optical imaging system according to claim 1, wherein the refractive power of the plurality of first microlenses has the same positive and negative characteristics, and the refractive power of the plurality of second microlenses has the same positive and negative characteristics, the plurality of first microlenses of the first array of microlenses form images of the object on image planes coplanar with each other, the plurality of second microlenses of the second array of microlenses have coplanar object side focal planes, and the object side focal planes coincide with the image planes of the first array of microlenses.

4. The near-eye optical imaging system according to claim 1, wherein the plurality of first microlenses have the same refractive power as each other, the distance between two second microlenses in any two optical channels is equal to the distance between two images of the object formed respectively by two first microlenses in the two optical channels.

5. The near-eye optical imaging system according to claim 1, wherein a distance $d_1$ between two first microlenses and a distance $d2$ between two second microlenses in any two optical channels satisfy the following relation:

$$d_2 = d_1(1+M_1)$$

wherein $M_1$ represents a magnification of the object by the first microlenses, i.e.

$$M_1 = \frac{v_1}{u_1};$$

$u_1$ is an object distance from the object plane to the first array of microlenses, and $v_1$ is an image distance from the image plane to the first array of microlenses, $u_1$ being positive when the object is a real object relative to the first microlenses, $u_1$ being negative when the object is a virtual object relative to the first microlenses, $v_1$ being positive when the first microlenses form a real image, and $v_1$ being negative when the first microlenses form a virtual image.

6. The near-eye optical imaging system according to claim 4, wherein the plurality of first microlenses of the first array of microlenses are arranged periodically, the plurality of second microlenses of the second array of microlenses are also arranged periodically, and both satisfy the following relation so that the angular magnification of the virtual image formed by the near-eye optical imaging system is 1:

$$P_2 = P_1(1+M_1)$$

wherein $P_1$ is an arrangement period of the plurality of first microlenses of the first array of microlenses in a direction, $P_2$ is an arrangement period of the plurality of second microlenses of the second array of microlenses in the direction, and $M_1$ represents a magnification of the object by the first microlenses, i.e.

$$M_1 = \frac{v_1}{u_1}.$$

7. The near-eye optical imaging system according to claim 5, wherein the equivalent focal length of the near-eye optical imaging system F is calculated by $$F = f_2 + \frac{P_2}{P_1}u_1,$$

$f_2$ is the focal length of the second microlens, wherein $P_1$ is an arrangement period of the plurality of first microlenses of the first array of microlenses in a direction, $P_2$ is an arrangement period of the plurality of second microlenses of the second array of microlenses in the direction, $u_1$ is an object distance from the object plane to the first array of microlenses.

8. The near-eye optical imaging system according to claim 1, wherein the plurality of second microlenses are positive lenses, and the plurality of first microlenses form an upright image of the object, the plurality of first microlenses are negative lenses, and the plurality of first microlenses form a shrinked virtual image of the object between the object and the first array of microlenses, the first array of microlenses and the second array of microlenses satisfy $P_1 > P_2$, wherein $P_1$ is an arrangement period of the plurality of first microlenses of the first array of microlenses in a direction, $P_2$ is an arrangement period of the plurality of second microlenses of the second array of microlenses in the direction.

9. The near-eye optical imaging system according to claim 1, wherein the plurality of second microlenses are negative lenses, and the plurality of first microlenses form an inverted image of the object, the plurality of first microlenses are positive lenses, and the plurality of first microlenses form a shrinked real image on a side of the second array of microlenses opposite to the first array of microlenses, the first array of microlenses and the second array of microlenses satisfy $P_1 < P_2$, wherein $P_1$ is an arrangement period of the plurality of first microlenses of the first array of microlenses in a direction, $P_2$ is an arrangement period of the plurality of second microlenses of the second array of microlenses in the direction.

10. The near-eye optical imaging system according to claim 1, wherein the plurality of first microlenses include at least two different types of lenses, and/or the plurality of second microlenses include at least two different types of lenses, the plurality of first microlenses and the plurality of second microlenses include at least one of spherical lens, aspheric lens, graded index lens, Fresnel lens or multi-level near-curved lens.

11. The near-eye optical imaging system according to claim 1, wherein at least one of the first microlenses and/or the second microlenses has intervals between adjacent lens units.

12. The near-eye optical imaging system according to claim 1, wherein at least a part of the first microlenses and/or the second microlenses is a combined lens comprising two or more microlenses in cascade, the first array of microlenses comprises two or more layers of microlens array superimposed together, and the two or more microlenses in cascade include microlenses from the two or more layers of microlens array respectively; and/or the second array of microlenses comprises two or more layers of microlens array superimposed together, and the two or more microlenses in cascade include microlenses from the two or more layers of microlens array respectively.

13. The near-eye optical imaging system according to claim 1, wherein the first array of microlenses and the second array of microlenses are formed on the surfaces of two separate substrates, facing each other, and an air gap exists in between the first array of microlenses and the second array of microlenses.

14. The near-eye optical imaging system according to claim 1, further comprising a substrate for carrying at least one of the first array of microlenses and/or the second array of microlenses, wherein the thickness of the substrate is varied in the direction parallel to an optical axis of the array of microlenses, at least one surface of two surfaces opposite to each other of the substrate in a direction parallel to the optical axis of the array of microlenses carried thereon is a curved or stepped surface.

15. The near-eye optical imaging system according to claim 1, wherein the predetermined object plane is located on the side of the first array of microlenses opposite to the second array of microlenses, the predetermined object plane is not located on the focal plane of the first array of microlenses, the distance between the predetermined object plane and the optical center of the first array of microlenses along the optical axis of the first array of microlenses is greater than the focal length of the first microlens.

16. The near-eye optical imaging system according to claim 15, furthering comprising a display arranged on the predetermined object plane and having a display surface for displaying images, wherein the distance between the predetermined object plane and the optical center of the first array of microlenses along the optical axis of the first array of microlenses is two to thirty times the focal length of the first microlens.

17. The near-eye optical imaging system according to claim 1, further comprising an array of apertures disposed to adjoin the first array of microlenses and/or the second array of microlenses, the array of apertures is attached to a surface of the first array of microlenses and/or the second array of microlenses, wherein the array of apertures comprises an opaque substrate and multiple light-transmitting holes formed on the opaque substrate, and the multiple light-transmitting holes are arranged corresponding to the plurality of first microlenses in the first array of microlenses.

18. The near-eye optical imaging system according to claim 16, further comprising a field lens placed inbetween the display and the first array of microlenses, having its main plane substantially coincident with the display surface of the display.

19. The near-eye optical imaging system according to claim 1, further comprising a field lens placed inbetween the first array of microlenses and the second array of microlenses, the field lens is formed on the opposite sides of the same substrate with reference to the first array of microlenses or the second array of microlenses.

20. The near-eye optical imaging system according to claim 19, wherein the thickness of the substrate in a direction parallel to the optical axis is varied, at least one surface of two surfaces opposite to each other of the substrate in a direction parallel to the optical axis of the second array of microlenses is a curved or stepped surface.

21. The near-eye optical imaging system according to claim 18, wherein the field lens is constituted by one of graded index lens, Fresnel lens, multi-level near-curved lens, spherical lens or aspheric lens.

22. The near-eye optical imaging system according to claim 16, further comprising a wave front modulated light source, emitting diverging or converging light to illuminate the display to achieve display on the display.

23. A near-eye display device, comprising:
a display, having a display surface for displaying images;
a first array of microlenses, arranged on a side of the display surface of the display, and comprising a plurality of first microlenses; and
a second array of microlenses, arranged on a side of the first array of microlenses opposite to the display, and comprising a plurality of second microlenses;
wherein the plurality of first microlenses each in the first array of microlenses correspond to one of the second microlenses in the second array of microlenses respectively to form multiple optical channels, wherein in each optical channel, the first microlens each forms an image of the display surface on the object side focal plane of the second microlens, to project a parallel light beam;
wherein corresponding to one and the same point on the display surface, multiple parallel light beams projected through the multiple optical channels are parallel to each other;
wherein corresponding to any two points at different positions on the display surface, parallel light beams in different directions are projected through the optical channels, and the relative relation of the different directions corresponds to the relative position relation of the two points on the display surface; and
wherein the display is placed at a distance to the first array of microlenses that is larger than the focal length of the first array of microlenses.

24. A near-eye optical imaging system, comprising:
a first array of microlenses comprising a plurality of first microlenses arranged periodically and having the same refractive power; and
a second array of microlenses arranged side by side with the first array of microlenses, comprising a plurality of second microlenses arranged periodically and having the same refractive power,
wherein one of the first array of microlenses and the second array of microlenses is a positive lens array, and the other is a negative lens array;
the plurality of first microlenses of the first array of microlenses form images of an object located on a predetermined object plane on the image planes that are coplanar with each other, the plurality of second microlenses of the second array of microlenses have object side focal planes coplanar with each other, and the object side focal planes coincide with the image planes; and
the first array of microlenses and the second array of microlenses are configured to meet the following relation so that the angular magnification of the virtual image formed by the near-eye optical imaging system is 1:

$$P_2 = P_1(1+M_1)$$

wherein $P_1$ is an arrangement period of the plurality of first microlenses of the first array of microlenses in a direction, $P_2$ is an arrangement period of the plurality of second microlenses of the second array of microlenses in the direction, and $M_1$ represents a magnification of the object by the first microlenses, i.e.

$$M_1 = \frac{v_1}{u_1},$$

$u_1$ is an object distance from the object plane to the first array of microlenses, and $v_1$ is an image distance from the image plane to the first array of microlenses, $u_1$ being positive when the object is a real object relative to the first microlens, $u_1$ being negative when the object is a virtual object relative to the first microlens, $v_1$ being positive when the first microlens forms a real image, and $v_1$ being negative when the first microlens forms a virtual image; and
wherein the display is placed at a distance to the first array of microlenses that is larger than the focal length of the first array of microlenses.

25. The near-eye optical imaging system according to claim 24, wherein the equivalent focal length of the near-eye optical imaging system F is calculated by $$F = f_2 + \frac{P_2}{P_1}u_1,$$

$f_2$ is the focal length of the second microlens, wherein $P_1$ is an arrangement period of the plurality of first microlenses of the first array of microlenses in a direction, $P_2$ is an arrangement period of the plurality of second microlenses of the second array of microlenses in the direction, $u_1$ is an object distance from the object plane to the first array of microlenses.

26. The near-eye optical imaging system according to claim 24, wherein the plurality of second microlenses are positive lenses, and the plurality of first microlenses form an upright image of the object, the plurality of first microlenses are negative lenses, and the plurality of first microlenses form a shrunken virtual image of the object between the object and the first array of microlenses, the first array of microlenses and the second array of microlenses satisfy $P_1 > P_2$.

27. The near-eye optical imaging system according to claim 24, wherein the plurality of second microlenses are negative lenses, and the plurality of first microlenses form an inverted image of the object, the plurality of first microlenses are positive lenses, and the plurality of first microlenses form a shrunken real image on a side of the second array of microlenses opposite to the first array of microlenses, the first array of microlenses and the second array of microlenses satisfy $P_1 < P_2$.

28. The near-eye optical imaging system according to claim 24, wherein the plurality of first microlenses include at least two different types of lenses, and/or the plurality of second microlenses include at least two different types of lenses.

29. The near-eye optical imaging system according to claim 24, furthering comprising a display arranged on the predetermined object plane and having a display surface for displaying images, wherein the predetermined object plane is not located on the focal plane of the first array of microlenses, the distance between the predetermined object plane and the optical center of the first array of microlenses along the optical axis of the first array of microlenses is two to thirty times the focal length of the first microlens.

30. A head-mounted display device, comprising a head-mounted device comprising a near-eye display device, the near-eye display device being arranged to be located within a near-eye range of both eyes of a wearer of the head-mounted display device, the near-eye display device comprising:

a display, having a display surface for displaying images;

a first array of microlenses, arranged on a side of the display surface of the display, and comprising a plurality of first microlenses; and a second array of microlenses, arranged on a side of the first array of microlenses opposite to the display, and comprising a plurality of second microlenses;

wherein the plurality of first microlenses each in the first array of microlenses correspond to one of the second microlenses in the second array of microlenses respectively to form multiple optical channels, wherein in each optical channel, the first microlens each forms an image of the display surface on the object side focal plane of the second microlens, to project a parallel light beam;

wherein corresponding to one and the same point on the display surface, multiple parallel light beams projected through the multiple optical channels are parallel to each other;

wherein corresponding to any two points at different positions on the display surface, parallel light beams in different directions are projected through the optical channels, and the relative relation of the different directions corresponds to the relative position relation of the two points on the display surface; and wherein the display is placed at a distance to the first array of microlenses that is larger than the focal length of the first array of microlenses.

31. The head-mounted display device according to claim 30, further comprising a control unit in connection and communication with the near-eye display device, operable to control the near-eye display device to switch between a 2D display mode and a 3D display mode, wherein the display of the near-eye display device, in the 2D display mode, shows the same image to the left and right eyes of the wearer, and the display of the near-eye display device, in the 3D display mode, shows different images to the left and right eyes of the wearer.

* * * * *